United States Patent
Seo

(10) Patent No.: US 11,614,895 B2
(45) Date of Patent: Mar. 28, 2023

(54) DATA STORAGE DEVICE FOR READ OPERATION AND METHOD OF THE SAME

(71) Applicant: SK hynix Inc., Gyeonggi-do (KR)

(72) Inventor: Yun Chan Seo, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/380,557

(22) Filed: Jul. 20, 2021

(65) Prior Publication Data

US 2022/0253245 A1 Aug. 11, 2022

(30) Foreign Application Priority Data

Feb. 5, 2021 (KR) .................. 10-2021-0017004

(51) Int. Cl.
*G06F 3/06* (2006.01)
*G06F 12/10* (2016.01)

(52) U.S. Cl.
CPC ............ *G06F 3/0659* (2013.01); *G06F 3/064* (2013.01); *G06F 3/0611* (2013.01); *G06F 3/0653* (2013.01); *G06F 3/0679* (2013.01); *G06F 12/10* (2013.01); *G06F 2212/657* (2013.01)

(58) Field of Classification Search
CPC ...... G06F 3/0611; G06F 3/064; G06F 3/0653; G06F 3/0659; G06F 3/0679; G06F 12/10; G06F 2212/657; G06F 3/0604; G06F 3/061; G06F 3/0656; G06F 3/0658; G06F 12/0246; G06F 12/0292; G06F 2212/7201
See application file for complete search history.

(56) References Cited

U.S. PATENT DOCUMENTS

| | | | |
|---|---|---|---|
| 9,244,858 B1* | 1/2016 | Hu | G06F 12/1072 |
| 2013/0339587 A1* | 12/2013 | Asnaashari | G06F 11/2005 |
| | | | 711/103 |
| 2019/0294358 A1* | 9/2019 | Suzuki | G06F 3/064 |
| 2020/0233796 A1* | 7/2020 | Kim | G06F 12/123 |
| 2021/0133058 A1* | 5/2021 | Kim | G11C 16/26 |

FOREIGN PATENT DOCUMENTS

| | | |
|---|---|---|
| KR | 10-2018-0016679 A | 2/2018 |
| KR | 10-2019-0086921 A | 7/2019 |

* cited by examiner

*Primary Examiner* — Larry T Mackall
(74) *Attorney, Agent, or Firm* — IP & T Group LLP

(57) ABSTRACT

The present technology relates to a memory controller capable of shortening a time required for a read operation by storing a map segment output based on a result of counting the number of times a map entry is called in a host. The memory controller controlling a memory device includes a central processing device configured to receive a read request from a host and perform an operation for outputting data corresponding to the read request to the host, and a flash translation layer configured to search for a map entry indicating a mapping relationship between a logical block address and a physical block address by receiving the logical block address corresponding to the read request from the central processing device, and store a read count table based on a result of searching the map entry.

20 Claims, 14 Drawing Sheets

| MAP_DATA | MAP_SEGMENT | READ_CNT |
|---|---|---|
| MAP_DATA1 | MAP_SEGMENT1 | 1000 |
| | MAP_SEGMENT2 | 500 |
| MAP_DATA2 | MAP_SEGMENT3 | 1500 |
| | MAP_SEGMENT4 | 2000 |

FIG. 5

| MAP_DATA | MAP_SEGMENT | MAP_ENTRY |
|---|---|---|
| MAP_DATA1 | MAP_SEGMENT1 | MAP_ENTRY1 |
| MAP_DATA1 | MAP_SEGMENT1 | MAP_ENTRY2 |
| MAP_DATA1 | MAP_SEGMENT1 | MAP_ENTRY3 |
| MAP_DATA1 | MAP_SEGMENT1 | MAP_ENTRY4 |
| MAP_DATA1 | MAP_SEGMENT2 | MAP_ENTRY5 |
| MAP_DATA1 | MAP_SEGMENT2 | MAP_ENTRY6 |
| MAP_DATA1 | MAP_SEGMENT2 | MAP_ENTRY7 |
| MAP_DATA1 | MAP_SEGMENT2 | MAP_ENTRY8 |
| MAP_DATA2 | MAP_SEGMENT3 | MAP_ENTRY9 |
| MAP_DATA2 | MAP_SEGMENT3 | MAP_ENTRY10 |
| MAP_DATA2 | MAP_SEGMENT3 | MAP_ENTRY11 |
| MAP_DATA2 | MAP_SEGMENT3 | MAP_ENTRY12 |
| MAP_DATA2 | MAP_SEGMENT4 | MAP_ENTRY13 |
| MAP_DATA2 | MAP_SEGMENT4 | MAP_ENTRY14 |
| MAP_DATA2 | MAP_SEGMENT4 | MAP_ENTRY15 |
| MAP_DATA2 | MAP_SEGMENT4 | MAP_ENTRY16 |

FIG. 7A

| MAP_DATA | MAP_SEGMENT | READ_CNT |
|---|---|---|
| MAP_DATA1 | MAP_SEGMENT1 | 1000 |
| | MAP_SEGMENT2 | 500 |
| MAP_DATA2 | MAP_SEGMENT3 | 1500 |
| | MAP_SEGMENT4 | 2000 |

FIG. 7B

| MAP_DATA | MAP_SEGMENT | FLAG |
|---|---|---|
| MAP_DATA1 | MAP_SEGMENT1 | 0 |
| | MAP_SEGMENT2 | 0 |
| MAP_DATA2 | MAP_SEGMENT3 | 0 |
| | MAP_SEGMENT4 | 1 |

DATA STORAGE DEVICE FOR READ OPERATION AND METHOD OF THE SAME

CROSS-REFERENCE TO RELATED APPLICATION

The present application claims priority under 35 U.S.C. § 119(a) to Korean patent application number 10-2021-0017004 filed on Feb. 5, 2021, the entire disclosure of which is incorporated by reference herein.

BACKGROUND

Field of Invention

The present disclosure relates to an electronic device, and more particularly, to a storage device and a method of operating the same.

Description of Related Art

A storage device is a device that stores data under control of a host device such as a computer, a smart phone, or a smart pad. The storage device includes a device that stores data in a magnetic disk such as a hard disk drive (HDD), a device that stores data in a semiconductor memory such as a solid state drive (SSD), or a memory card, in particular, a nonvolatile memory.

The storage device may include a memory device in which data is stored and a memory controller that stores data in the memory device. The memory device may be classified into a volatile memory and a nonvolatile memory. Here, the nonvolatile memory includes a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like.

SUMMARY

An embodiment of the present disclosure provides a storage device and a method of operating the same, which shorten a time required for a read operation by storing a map segment, which is output based on a result of counting the number of times a map entry is called, in a host.

According to an embodiment of the present disclosure, a memory controller controlling a memory device may include a central processing device configured to receive a read request from a host and perform an operation for outputting data corresponding to the read request to the host and a flash translation layer configured to search for a map entry indicating a mapping relationship between a logical block address and a physical block address by receiving the logical block address corresponding to the read request from the central processing device, store a read count table based on a result of searching for the map entry. The flash translation layer may increase a read count included in the read count table each time the map entry is searched, and select a map segment including the map entry to be output to a host memory buffer included in the host based on the read count.

According to an embodiment of the present disclosure, a method of operating a memory controller that controls a memory device may include receiving a read request from a host, searching for a map entry indicating a mapping relationship between a physical block address and a logical block address corresponding to the read request, storing a read count table based on a result of searching for the map entry. In storing the read count table, each time the map entry is searched, a read count included in the read count table may be increased, and a map segment including the map entry to be output to a host memory buffer included in the host may be selected based on the read count.

According to an embodiment of the present disclosure, a storage device may include a memory device and a memory controller that controls the memory device. The memory controller may receive a read request from a host, and store a read count table based on a result of searching for a map entry indicating a mapping relationship between a physical block address and a logical block address corresponding to the read request. The memory device may store and update the read count table output from the memory controller every preset period.

According to an embodiment of the present disclosure, an operating method of host and storage device, the operating method may include providing, by the storage device, the host with a map segment of a predetermined or greater number of times that the map segment is accessed to identify a physical address corresponding to a logical address provided from the host; and providing, by the host, the storage device with a physical address, which is included in the provided map segment, wherein the physical address is utilized to access a storage space within the storage device.

According to the present technology, a time for searching and reading map data may be shortened by counting the number of times a map entry corresponding to a read request is called for each map segment and outputting the map segment to a host based on a counted value.

BRIEF DESCRIPTION OF THE DRAWINGS

FIG. 5 is a diagram illustrating map data, a map segment, and a map entry according to an embodiment of the present disclosure.

FIGS. 7A and 7B illustrate a read count table stored in a flash translation layer according to an embodiment of the present disclosure.

DETAILED DESCRIPTION

Specific structural or functional descriptions of embodiments according to the concept which are disclosed in the present specification are illustrated only to describe the embodiments according to the concept of the present disclosure. The embodiments according to the concept of the present disclosure may be carried out in various forms and should not be construed as being limited to the embodiments described in the present specification.

Figure 1:
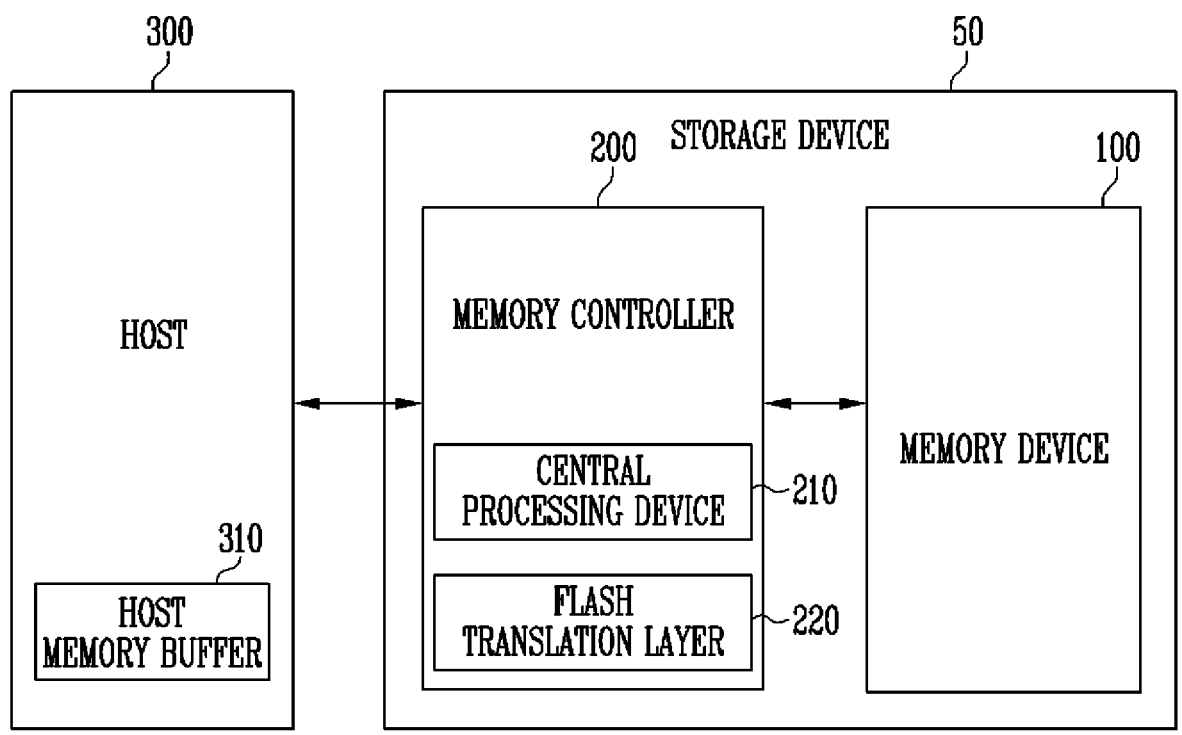
FIG. 1 is a block diagram illustrating a storage device according to an embodiment of the present disclosure.

FIG. 1 is a block diagram illustrating a storage device according to an embodiment of the present disclosure.

Referring to FIG. 1, the storage device 50 may include a memory device 100 and a memory controller 200.

The storage device 50 may be a device that stores data under control of a host 300 such as a cellular phone, a smartphone, an MP3 player, a laptop computer, a desktop computer, a game player, a TV, a tablet PC, or an in-vehicle infotainment system.

The storage device 50 may be manufactured as one of various types of storage devices according to a host interface that is a communication method with the host 300. For example, the storage device 50 may be configured as any of various types of storage devices such as an SSD, a multimedia card in a form of an MMC, an eMMC, an RS-MMC and a micro-MMC, a secure digital card in a form of an SD, a mini-SD and a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-E) card type storage device, a compact flash (CF) card, a smart media card, and a memory stick.

The storage device 50 may be manufactured as any of various types of packages. For example, the storage device 50 may be manufactured as any of various types of packages, such as a package on package (POP), a system in package (SIP), a system on chip (SOC), a multi-chip package (MCP), a chip on board (COB), a wafer-level fabricated package (WFP), and a wafer-level stack package (WSP).

The memory device 100 may store data. The memory device 100 operates in response to control of the memory controller 200. The memory device 100 may include a memory cell array including a plurality of memory cells storing the data. The memory cell array may include a plurality of memory blocks. Each of the memory blocks may include a plurality of memory cells, and the plurality of memory cells may configure a plurality of pages. In an embodiment, a page may be a unit for storing data in the memory device 100 or reading data stored in the memory device 100. The memory block may be a unit for erasing data.

In an embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change memory (PRAM), a magnetoresistive random access memory (MRAM), a ferroelectric random access memory (FRAM), a spin transfer torque random access memory (STT-RAM), or the like. In the present specification, for convenience of description, the memory device 100 is a NAND flash memory.

The memory device 100 may be implemented as a two-dimensional array structure or a three-dimensional array structure. Hereinafter, the three-dimensional array structure is described as an embodiment, but the present disclosure is not limited to the three-dimensional array structure. The present disclosure may be applied not only to a flash memory device in which a charge storage layer is configured of a conductive floating gate (FG), but also to a charge trap flash (CTF) in which the charge storage layer is configured of an insulating film.

In an embodiment, the memory device 100 may operate in a single level cell (SLC) method in which one data bit is stored in one memory cell. Alternatively, the memory device 100 may operate in a method of storing at least two data bits in one memory cell. For example, the memory device 100 may operate in a multi-level cell (MLC) method of storing two data bits in one memory cell, a triple level cell (TLC) method of storing three data bits in one memory cell, or a quadruple level cell (QLC) method of storing four data bits in one memory cell.

The memory device 100 is configured to receive a command and an address from the memory controller 200 and access an area selected by the address in the memory cell array. That is, the memory device 100 may perform an operation corresponding to the command on the area selected by the address. For example, the memory device 100 may perform a write operation (program operation), a read operation, or an erase operation according to the received command. For example, when a program command is received, the memory device 100 may program data to the area selected by the address. When a read command is received, the memory device 100 may read data from the area selected by the address. When an erase command is received, the memory device 100 may erase data stored in the area selected by the address.

The memory controller 200 may control an overall operation of the storage device 50.

When a power voltage is applied to the storage device 50, the memory controller 200 may execute firmware. When the memory device 100 is a flash memory device 100, the memory controller 200 may operate firmware such as a flash translation layer (FTL) for controlling communication between the host 300 and the memory device 100.

In an embodiment, the memory controller 200 may include firmware (not shown) that may receive data and a logical block address (LBA) from the host 300 and convert the LBA into a physical block address (PBA) indicating an address of memory cells in which data included in the memory device 100 is to be stored. In addition, the memory controller 200 may store a logical-physical address mapping table configuring a mapping relationship between the LBA and the PBA in a buffer memory.

The memory controller 200 may control the memory device 100 to perform the program operation, the read operation, the erase operation, or the like according to the request of the host 300. For example, when a program request is received from the host 300, the memory controller 200 may convert the program request into a program command, and may provide the program command, the PBA, and data to the memory device 100. When a read request is received from the host 300 together with the LBA, the memory controller 200 may change the read request into a read command, select a PBA corresponding to the LBA, and then provide the read command and the PBA to the memory device 100. When an erase request is received from the host 300 together with the LBA, the memory controller 200 may change the erase request into an erase command, select a PBA corresponding to the LBA, and then provide the erase command and the PBA to the memory device 100.

In an embodiment, the memory controller 200 may generate and transmit the program command, the address, and the data to the memory device 100 without the request from the host 300. For example, the memory controller 200 may provide the command, the address, and the data to the memory device 100 to perform background operations such as a program operation for wear leveling and a program operation for garbage collection.

In an embodiment, the memory controller 200 may include a central processing device 210 and a flash translation layer 220. In FIG. 1, the memory controller is illustrated as including the central processing device 210 and the flash translation layer 220, but the flash translation layer 220 may be firmware included in the central processing device 210 and driven by the central processing device 210.

In an embodiment, the memory controller 200 may include a central processing device 210. The central processing device 210 may receive a request from the host 300 and perform a series of operations so that an operation corresponding to the received request is performed by the memory device 100.

For example, the central processing device 210 may receive a read request from the host 300. The read request may be a request instructing to read data stored in the memory device 100. At this time, the central processing device 210 may receive the LBA corresponding to the read request from the host 300 together with the read request. In order to output the PBA corresponding to the LBA to the memory device 100, when the central processing device 210 receives the LBA from the host 300, the central processing device 210 may output the received LBA to a flash translation layer 220.

In an embodiment, when map data including a map entry indicating a mapping relationship between the LBA received from the host 300 and the PBA is not stored in the flash translation layer 220, the map data including the map entry indicating the mapping relationship between the LBA and the PBA may be received from the memory device 100. Here, the map data may be configured of a plurality of map segments, and the map segment may be configured of a plurality of map entries.

In an embodiment, when the map data including the map entry indicating the mapping relationship between the LBA received from the host 300 and the PBA is stored in the flash translation layer 220, the central processing device 210 may receive the PBA included in the corresponding map data from the flash translation layer 220.

Thereafter, the central processing device 210 may output the PBA corresponding to the LBA to the memory device 100 together with the read command corresponding to the read request received from the host 300. Specifically, the central processing device 210 may output the PBA based on the map entry indicating the mapping relationship between the LBA received from the host 300 and the PBA among the map entries included in each of the map segments of the map data received from the flash translation layer 220.

When the memory device 100 receives the read command and the PBA from the central processing device 210, the memory device 100 may output data stored in a position corresponding to the PBA to the memory controller 200 in response to the read command.

In an embodiment, the memory controller 200 may include the flash translation layer 220. The flash translation layer 220 may convert the LBA received with the request from the host 300 into the PBA. In addition, the flash translation layer 220 may store the mapping relationship between the LBA and the PBA, that is, the map data between the LBA and the PBA.

In an embodiment, when the flash translation layer 220 receives the LBA corresponding to the request from the central processing device 210, the flash translation layer 220 may determine whether the map data including the map entry corresponding to the LBA is stored, before converting the LBA into the PBA. When the corresponding map data is stored in the flash translation layer 220, the flash translation layer 220 may output the PBA included in the map data to the central processing device 210. When the map data is not stored in the flash translation layer 220 and the corresponding map data is not received from the memory device 100, the flash translation layer 220 may convert the LBA into the PBA. After converting the LBA into the PBA, the flash translation layer 220 may store the map data indicating the mapping relationship between the LBA and the PBA.

In an embodiment, a size of the map data that may be stored in the flash translation layer 220 may be limited. That is, since a size of a memory (for example, a DRAM or an SRAM) in which the map data is stored in the flash translation layer 220 is limited, only some of the converted map data may be stored in the flash translation layer 220. In addition, due to spatial and cost problems, the size of the memory in which the map data is stored in the flash translation layer 220 may be limited.

Therefore, in the present disclosure, instead of maintaining or reducing the size of the memory in which the map data is stored in the flash translation layer 220, a method of using a host memory buffer 310 by the memory controller 200 is presented. That is, a method in which the host 300 allocates the host memory buffer 310 to store the map data and the memory controller 200 accesses the host memory buffer 310 is presented.

In an embodiment, when a sudden power off (SPO) occurs, the flash translation layer 220 may output the stored map data to the memory device 100, and the memory device 100 may store the received map data. At this time, the map data may be output to the memory device 100 in a map segment unit, and may be output in an order in which the number of times the map entry included in the map segment is called is greater.

Thereafter, during a recovery operation for SPO, the flash translation layer 220 may receive and store the stored map data from the memory device 100.

In the present disclosure, the flash translation layer 220 may output the map segment corresponding to data frequently read to the host 300 among the map segments included in each of the map data received from the memory device 100, to the host 300 through the central processing device 210. The host 300 may search for the map segment including the map entry indicating the PBA corresponding to the corresponding LBA before outputting the read request and the LBA corresponding to the read request, by storing the received map segment.

In an embodiment, the storage device 50 may further include a buffer memory (not shown). The memory controller 200 may control data exchange between the host 300 and the buffer memory (not shown). Alternatively, the memory controller 200 may temporarily store system data for controlling the memory device 100 in the buffer memory. For example, the memory controller 200 may temporarily store data input from the host 300 in the buffer memory, and then transmit data temporarily stored in the buffer memory to the memory device 100.

In various embodiments, the buffer memory may be used as an operation memory and a cache memory of the memory controller 200. The buffer memory may store codes or commands executed by the memory controller 200. Alternatively, the buffer memory may store data processed by the memory controller 200.

In an embodiment, the buffer memory may be implemented as a dynamic random access memory (DRAM) such as a double data rate synchronous dynamic random access memory (DDR SDRAM), a DDR4 SDRAM, a low power double data rate4 (LPDDR4) SDRAM, a graphics double data rate (GDDR) SDRAM, a low power DDR (LPDDR), or Rambus dynamic random access memory (DRAM), or a static random access memory (SRAM).

In various embodiments, the buffer memory may be connected from an outside of the storage device 50. In this case, the volatile memory devices connected to the outside of the storage device 50 may serve as the buffer memory.

In an embodiment, the memory controller 200 may control at least two or more memory devices. In this case, the memory controller 200 may control the memory devices according to an interleaving method in order to improve operation performance.

The host 300 may communicate with the storage device 50 using at least one of various communication standards or interfaces such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multi-media card (MMC), an embedded MMC (eMMC), a dual in-line memory module (DIMM), a registered DIMM (RDIMM), and a load reduced DIMM (LRDIMM).

In an embodiment, the host 300 may include the host memory buffer 310. The host memory buffer 310 may store the map data output from the memory controller 200 in the map segment unit during the recovery operation after the SPO.

Thereafter, before the host 300 outputs the read request and the LBA corresponding to the read request, the host 300 may determine whether the map segment including the map entry indicating the PBA corresponding to the corresponding LBA is stored in the host memory buffer 310. When the corresponding map segment is stored in the host memory buffer 310, the host 300 may output the PBA indicated by the searched map entry to the memory controller 200 together with the read request. Therefore, a process in which the memory controller 200 searches for the map data corresponding to the LBA received from the host 300 or converts the LBA into the PBA may be omitted.

As a result, a time required to search for the map data indicating the mapping relationship between the PBA and the LBA output together with the read request may be shortened by storing the map segment in the host memory buffer 310 and first searching for the map segment stored in the host memory buffer 310 before outputting the read request to the output memory controller 200. Therefore, a time consumed for the read operation may be shortened.

Figure 2:
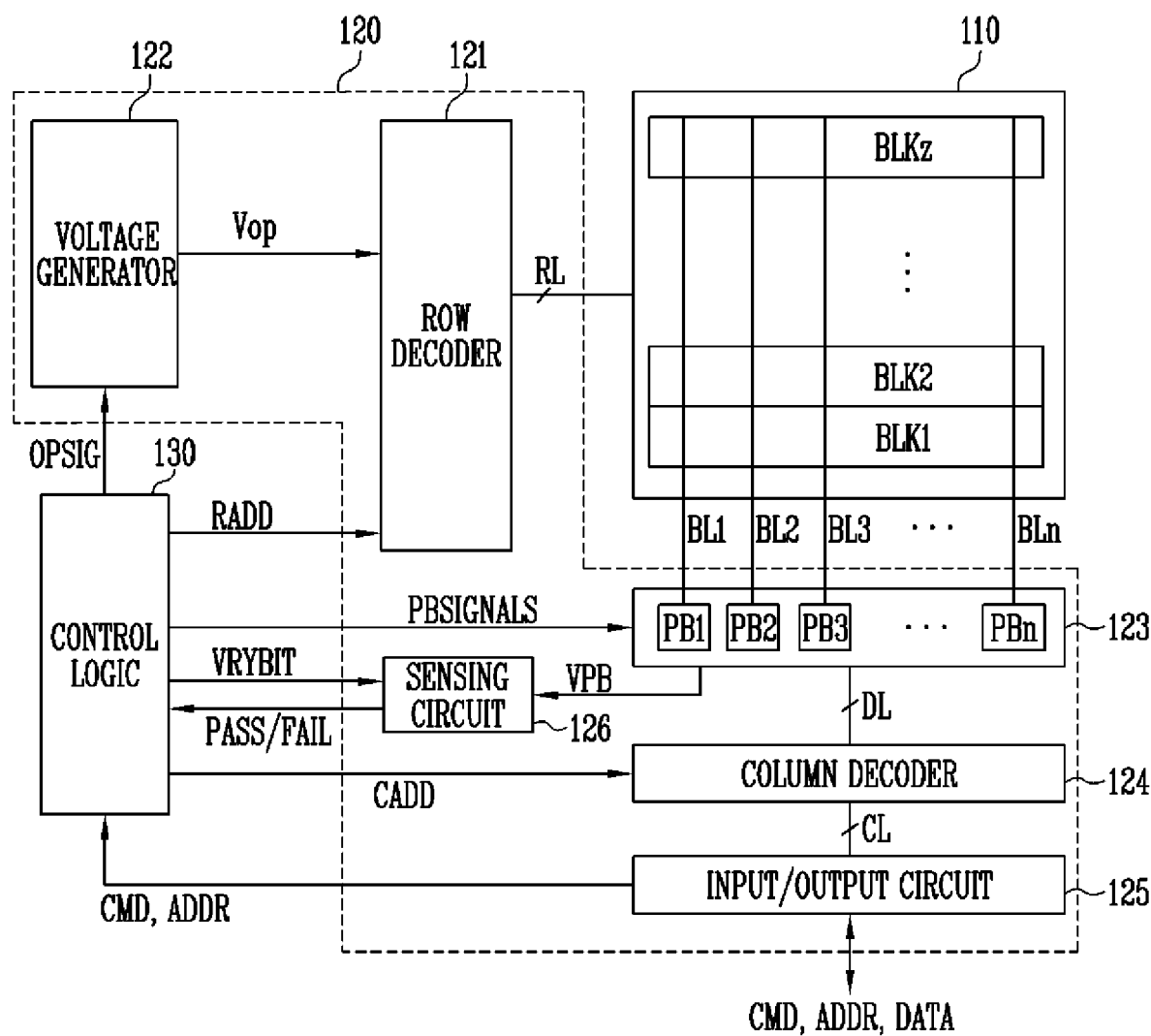
FIG. 2 is a diagram illustrating a structure of a memory device of FIG. 1 according to an embodiment of the present disclosure.

FIG. 2 is a diagram illustrating a structure of the memory device of FIG. 1, according to an embodiment of the present disclosure.

Referring to FIG. 2, the memory device 100 may include a memory cell array 110, a peripheral circuit 120, and a control logic 130.

The memory cell array 110 includes a plurality of memory blocks BLK1 to BLKz. The plurality of memory blocks BLK1 to BLKz are connected to a row decoder 121 through row lines RL. The plurality of memory blocks BLK1 to BLKz may be connected to the page buffer group 123 through bit lines BL1 to BLn. Each of the plurality of memory blocks BLK1 to BLKz includes a plurality of memory cells. In an embodiment, the plurality of memory cells are nonvolatile memory cells. Memory cells connected to the same word line may be defined as one page. Therefore, one memory block may include a plurality of pages.

The row lines RL may include at least one source select line, a plurality of word lines, and at least one drain select line.

Each of the memory cells included in the memory cell array 110 may be configured as an SLC that stores one data bit, an MLC that stores two data bits, a TLC that stores three data bits, or a QLC that stores four data bits.

The peripheral circuit 120 may be configured to perform the program operation, the read operation, or the erase operation on a selected area of the memory cell array 110 under control of the control logic 130. The peripheral circuit 120 may drive the memory cell array 110. For example, the peripheral circuit 120 may apply various operation voltages to the row lines RL and the bit lines BL1 to BLn or discharge the applied voltages under the control of the control logic 130.

The peripheral circuit 120 may include a row decoder 121, a voltage generator 122, the page buffer group 123, a column decoder 124, an input/output circuit 125, and a sensing circuit 126.

The row decoder 121 is connected to the memory cell array 110 through the row lines RL. The row lines RL may include at least one source select line, a plurality of word lines, and at least one drain select line. In an embodiment, the word lines may include normal word lines and dummy word lines. In an embodiment, the row lines RL may further include a pipe select line.

The row decoder 121 is configured to decode a row address RADD received from the control logic 130. The row decoder 121 selects at least one memory block among the memory blocks BLK1 to BLKz according to a decoded address. In addition, the row decoder 121 may select at least one word line of the memory block selected to apply the voltages generated by the voltage generator 122 to at least one word line WL according to the decoded address.

For example, during the program operation, the row decoder 121 may apply a program voltage to a selected word line and apply a program pass voltage of a level lower than the program voltage to an unselected word line. During a program verify operation, the row decoder 121 may apply a verify voltage to the selected word line and a verify pass voltage higher than the verify voltage to the unselected word line. During the read operation, the row decoder 121 may apply a read voltage to the selected word line and apply a read pass voltage higher than the read voltage to the unselected word line.

In an embodiment, the erase operation of the memory device 100 is performed in a memory block unit. During the erase operation, the row decoder 121 may select one memory block according to the decoded address. During the erase operation, the row decoder 121 may apply a ground voltage to the word lines connected to the selected memory block.

The voltage generator 122 operates in response to the control of the control logic 130. The voltage generator 122 is configured to generate a plurality of voltages using an external power voltage supplied to the memory device 100. Specifically, the voltage generator 122 may generate various operation voltages Vop used for the program, read, and erase operations, in response to an operation signal OPSIG. For example, the voltage generator 122 may generate the program voltage, the verify voltage, the pass voltage, the read voltage, the erase voltage, and the like in response to the control of the control logic 130.

In an embodiment, the voltage generator 122 may generate an internal power voltage by regulating the external power voltage. The internal power voltage generated by the voltage generator 122 is used as an operation voltage of the memory device 100.

In an embodiment, the voltage generator 122 may generate a plurality of voltages using the external power voltage or the internal power voltage.

For example, the voltage generator 122 may include a plurality of pumping capacitors that receive the internal power voltage, and may selectively activate the plurality of pumping capacitors to generate the plurality of voltages, in response to the control of the control logic 130.

The generated plurality of voltages may be supplied to the memory cell array 110 by the row decoder 121.

The page buffer group 123 includes first to n-th page buffers PB1 to PBn. The first to n-th page buffers PB1 to PBn are connected to the memory cell array 110 through the first to n-th bit lines BL1 to BLn, respectively. The first to n-th page buffers PB1 to PBn operate in response to the control of the control logic 130. Specifically, the first to n-th page buffers PB1 to PBn may operate in response to page buffer control signals PBSIGNALS. For example, the first to n-th page buffers PB1 to PBn may temporarily store data received through the first to n-th bit lines BL1 to BLn, or may sense a voltage or a current of the bit lines BL1 to BLn during the read or verify operation.

Specifically, during the program operation, when the program voltage is applied to the selected word line, the first to n-th page buffers PB1 to PBn may transfer data DATA received through the input/output circuit 125 to the selected memory cells through the first to n-th bit lines BL1 to BLn. The memory cells of the selected page are programmed according to the transferred data DATA. During the program verify operation, the first to n-th page buffers PB1 to PBn may read page data by sensing the voltage or the current received from the selected memory cells through the first to n-th bit lines BL1 to BLn.

During the read operation, the first to n-th page buffers PB1 to PBn read the data DATA from the memory cells of the selected page through the first to n-th bit lines BL1 to BLn, and outputs the read data DATA to the input/output circuit 125 under control of the column decoder 124.

During the erase operation, the first to n-th page buffers PB1 to PBn may float the first to n-th bit lines BL1 to BLn or apply the erase voltage.

The column decoder 124 may transfer data between the input/output circuit 125 and the page buffer group 123 in response to a column address CADD. For example, the column decoder 124 may exchange data with the first to n-th page buffers PB1 to PBn through data lines DL, or may exchange data with the input/output circuit 125 through column lines CL.

The input/output circuit 125 may transfer the command CMD and the address ADDR received from the memory controller 200 of FIG. 1 described with reference to FIG. 1 to the control logic 130, or may exchange data DATA with the column decoder 124.

The sensing circuit 126 may generate a reference current in response to a permission bit signal VRYBIT during the read operation or the verify operation, and compare a sensing voltage VPB received from the page buffer group 123 with a reference voltage generated by the reference current to output a pass signal PASS or a fail signal FAIL.

The control logic 130 may output the operation signal OPSIG, the row address RADD, the page buffer control signals PBSIGNALS, and the permission bit signal VRYBIT in response to the command CMD and the address ADDR to control the peripheral circuit 120. For example, the control logic 130 may control the read operation of the selected memory block in response to a sub block read command and the address. In addition, the control logic 130 may control the erase operation of the selected sub block included in the selected memory block in response to the sub block erase command and the address. In addition, the control logic 130 may determine whether the verify operation is passed or failed in response to the pass signal PASS or the fail signal FAIL.

Figure 3:
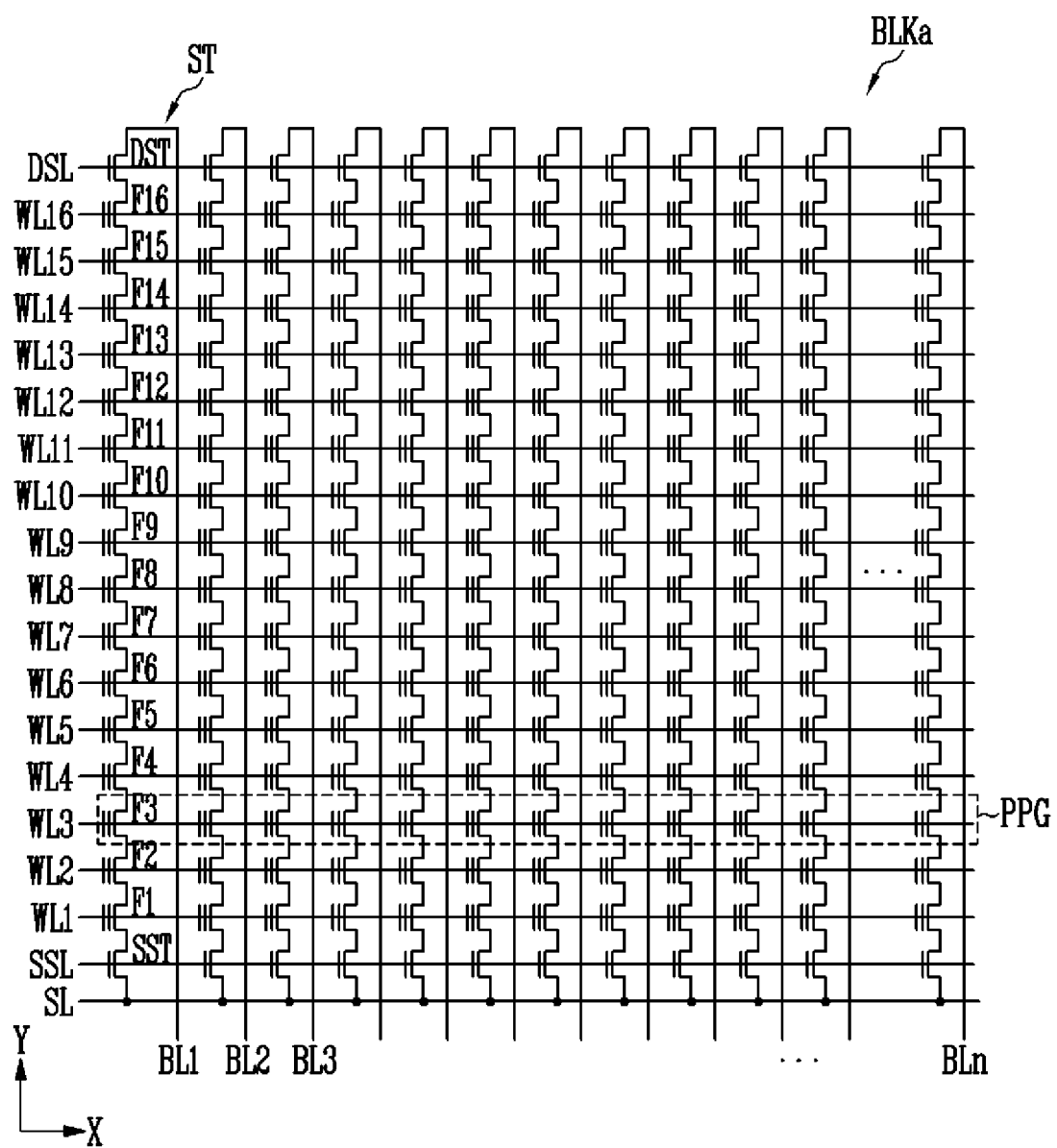
FIG. 3 is a diagram illustrating a memory cell array of FIG. 2 according to an embodiment of the present disclosure.

FIG. 3 is a diagram illustrating an embodiment of the memory cell array of FIG. 2, according to an embodiment of the present disclosure.

Referring to FIGS. 2 and 3, FIG. 3 is a circuit diagram showing a memory block BLKa among the plurality of memory blocks BLK1 to BLKz included in the memory cell array 110 of FIG. 2.

A first select line, word lines, and a second select line arranged in parallel with each other may be connected to the memory block BLKa. For example, the word lines may be arranged in parallel with each other between the first and second select lines. Here, the first select line may be the source select line SSL, and the second select line may be the drain select line DSL.

More specifically, the memory block BLKa may include a plurality of strings connected between the bit lines BL1 to BLn and a source line SL. The bit lines BL1 to BLn may be connected to the strings, respectively, and the source line SL may be commonly connected to the strings. Since the strings may be configured to be identical to each other, a string ST connected to the first bit line BL1 is specifically described as an example.

The string ST may include a source select transistor SST, a plurality of memory cells F1 to F16, and a drain select transistor DST connected in series between the source line SL and the first bit line BL1. One string ST may include at least one or more of the source select transistor SST and the drain select transistor DST, and may include more than the number of the memory cells F1 to F16 shown in the drawing.

A source of the source select transistor SST may be connected to the source line SL and a drain of the drain select transistor DST may be connected to the first bit line BL1. The memory cells F1 to F16 may be connected in series between the source select transistor SST and the drain select transistor DST. Gates of the source select transistors SST included in the different strings may be connected to the source select line SSL, gates of the drain select transistors DST may be connected to the drain select line DSL, and gates of the memory cells F1 to F16 may be connected to a plurality of word lines WL1 to WL16. A group of the memory cells connected to the same word line among the memory cells included in different strings may be referred to as a physical page PPG. Therefore, the memory block BLKa may include a number of physical pages PPG corresponding to the number of the word lines WL1 to WL16.

One memory cell may store one bit of data. This is commonly referred to as a SLC. In this case, one physical page PPG may store one logical page (LPG) data. One logical page (LPG) data may include a number of data bits corresponding to the number of memory cells included in one physical page PPG. In addition, one memory cell may store two or more bits of data. This is commonly referred to as an MLC. In this case, one physical page PPG may store two or more logical page (LPG) data.

A memory cell in which two or more bits of data are stored in one memory cell is referred to as the MLC, but recently, as the number of bits of data stored in one memory cell increases, the MLC refers to a memory cell in which two bits of data is stored, a memory cell in which three or more bits of data are stored is referred to as a TLC, and a memory cell in which four or more bits of data are stored is referred to as a QLC. In addition, a memory cell method in which a plurality of bits of data are stored has been developed, and the present embodiment may be applied to the memory device 100 in which two or more bits of data are stored.

In another embodiment, the memory block may have a three-dimensional structure. Each memory block includes a plurality of memory cells stacked on a substrate. Such plurality of memory cells are arranged along a +X direction, a +Y direction, and a +Z direction.

Figure 4:
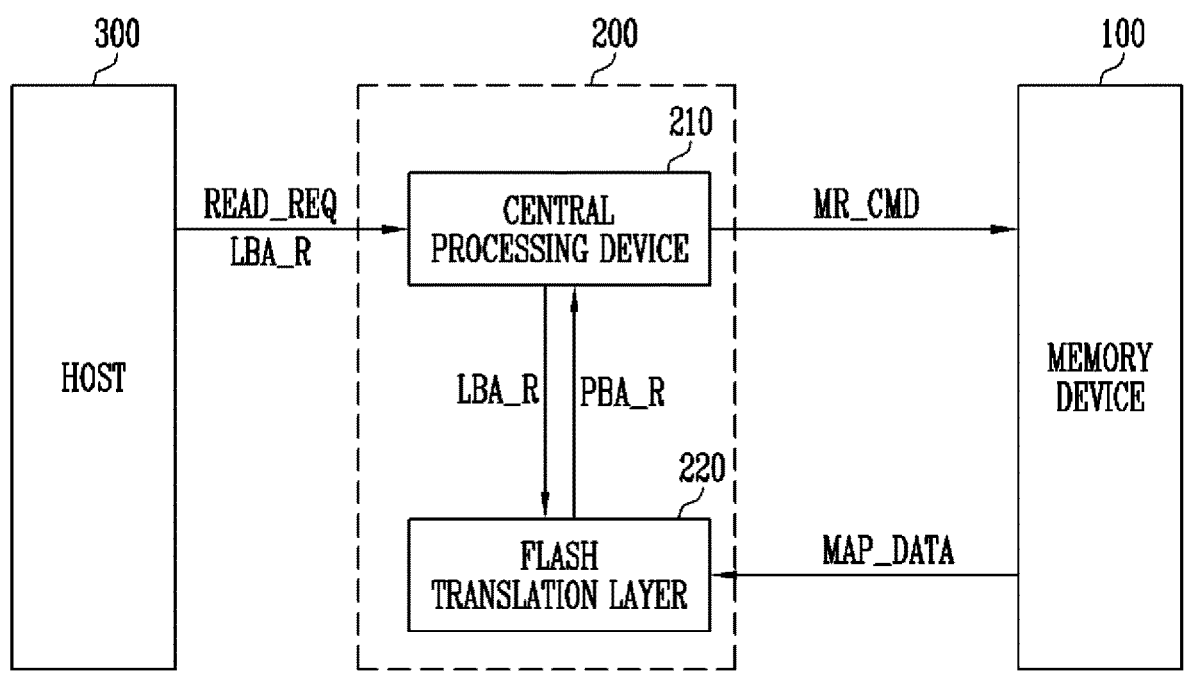
FIG. 4 is a diagram illustrating a method of obtaining map data by a memory controller according to an embodiment of the present disclosure.

FIG. 4 is a diagram illustrating a method of obtaining the map data by the memory controller according to an embodiment of the present disclosure.

Referring to FIG. 4, FIG. 4 shows a process in which operations for performing a read operation corresponding to a read request READ_REQ received from the host 300 to the memory device 100 are performed. The memory controller 200 of FIG. 4 may include the central processing device 210 and the flash translation layer 220.

In an embodiment, the central processing device 210 may receive the read request READ_REQ and an LBA LBA_R corresponding to the read request READ_REQ from the host 300. When the central processing device 210 receives the read request READ_REQ and the LBA LBA_R, the central processing device 210 may perform the operations for performing the read operation corresponding to the read request READ_REQ to the memory device 100.

For example, the central processing device 210 may output the LBA LBA_R corresponding to the read request READ_REQ to the flash translation layer 220. At this time, when map data MAP_DATA including a map entry corresponding to the LBA LBA_R is stored in the flash translation layer 220, the central processing device 210 may receive a PBA PBA_R included in the map entry from the flash translation layer 220. Here, the map entry may indicate the mapping relationship between the LBA and the PBA. In addition, the corresponding map entry may be any of a plurality of map entries included in the map data MAP_DATA.

However, when the PBA PBA_R is not received from the flash translation layer 220 because the map data MAP_DATA is not stored in the flash translation layer 220, the central processing device 210 may output a map data read command MR_CMD. The map data read command MR_CMD may be a command instructing to output the map data MAP_DATA including the map entry corresponding to the LBA LBA_R.

In an embodiment, the memory device 100 may read and output the map data MAP_DATA including the map entry corresponding to the LBA LBA_R output from the host 300 to the flash translation layer 220 in response to the map data read command MR_CMD. The flash translation layer 220 may store the map data MAP_DATA output from the memory device 100, and then output the map data MAP_DATA to the central processing device 210.

Thereafter, the central processing device 210 may output a read command corresponding to the read request READ_REQ and the PBA indicated by the map entry corresponding to the LBA LBA_R among the map entries included in the map data MAP_DATA to the memory device 100. The memory device 100 may read data stored in a position corresponding to the PBA in response to the read command received from the central processing device 210, and output the read data to the memory controller 200.

In an embodiment, the SPO may occur. When the SPO occurs, in order to prevent loss of the map data MAP_DATA stored in the flash translation layer 220, the map data MAP_DATA stored in the flash translation layer 220 may be output to the memory device 100.

However, during the SPO, all map data MAP_DATA stored in the flash translation layer 220 may not be output to the memory device 100 and may not be stored in the memory device 100. As a result, some of all map data MAP_DATA stored in the flash translation layer 220 may be lost.

Therefore, in the present disclosure, in order to prevent loss of the map data MAP_DATA stored in the flash translation layer 220, a method of allocating within the host 300 an area in which the map data MAP_DATA is to be stored, and selecting some of the map segments included in each of the map data MAP_DATA and transmitting the selected map segments to the host 300 during the recovery for the SPO, is presented.

FIG. 5 is a diagram illustrating the map data, the map segment, and the map entry according to an embodiment of the present disclosure.

Referring to FIG. 5, FIG. 5 shows the map data MAP_DATA stored in the flash translation layer 220 of FIG. 4.

In an embodiment, the map data MAP_DATA may include at least one or more map segments MAP_SEGMENT. In addition, the map segment MAP_SEGMENT may include at least one or more map entries MAP_ENTRY. Here, the map entry MAP_ENTRY may be data indicating the mapping relationship between the LBA and the PBA.

In FIG. 5, each map data MAP_DATA is configured of two map segments, and each map segment MAP_SEGMENT is configured of four map entries MAP_ENTRY, but the map data MAP_DATA may be configured of a lesser number or a greater number of map segments MAP_SEGMENT, or the map segment MAP_SEGMENT may be configured of a lesser number or a greater number of map entries MAP_ENTRY.

In FIG. 5, first and second map data MAP_DATA1 and MAP_DATA2 may be stored in the flash translation layer 220 of FIG. 4.

Specifically, the first map data MAP_DATA1 stored in the flash translation layer 220 of FIG. 4 may be configured of first and second map segments MAP_SEGMENT1 and MAP_SEGMENT2, and the second map data MAP_DATA2 may be configured of third and fourth map segments MAP_SEGMENT3 and MAP_SEGMENT4. In addition, the first map segment MAP_SEGMENT1 may be configured of first to fourth map entries MAP_ENTRY1 to 4, the second map segment MAP_SEGMENT2 may be configured of fifth to eighth map entries MAP_ENTRY5 to 8, the third map segment MAP_SEGMENT3 may be configured of ninth to twelfth map entries MAP_ENTRY9 to 12, and the fourth map segment MAP_SEGMENT4 may be configured of thirteenth to sixteenth map entries MAP_ENTRY13 to 16.

In an embodiment, when the SPO occurs, some of the map data MAP_DATA stored in the flash translation layer 220 of FIG. 4 may be output to the memory device 100 of FIG. 4. Thereafter, during the recovery for the SPO, the map data MAP_DATA stored in the memory device 100 of FIG. 4 may be output and stored in the flash translation layer 220 of FIG. 4.

However, since the size of the memory in which the map data MAP_DATA is stored in the flash translation layer 220 of FIG. 4 is limited, in the present disclosure, the flash translation layer 220 of FIG. 4 may receive some of the map segments MAP_SEGMENT included in the map data MAP_DATA from the memory device 100 of FIG. 4 and output the some of the map segments MAP_SEGMENT to the host 300 of FIG. 4.

In an embodiment, a size of the host memory buffer allocated to store the map data MAP_DATA in the host 300 of FIG. 4 may also be limited, and a latency for the memory controller 200 of FIG. 4 to access the host 300 of FIG. 4 may occur. Therefore, the flash translation layer 220 of FIG. 4 may output only some of the map segments MAP_SEGMENT included in the map data MAP_DATA to the host 300 of FIG. 4.

Specifically, during the recovery for the SPO, the flash translation layer 220 of FIG. 4 may receive the map segments MAP_SEGMENT including the map entries MAP_ENTRY corresponding to the data frequently output to the host 300 of FIG. 4 among the map segments MAP_SEGMENT included in each of the map data MAP_DATA stored in the memory device 100 of FIG. 4. The flash translation layer 220 of FIG. 4 may receive the map segments MAP_SEGMENT and output the map segments MAP_SEGMENT to the host 300 of FIG. 4.

For example, the map entry MAP_ENTRY corresponding to the data frequently output to the host 300 of FIG. 4 may be the first map entry MAP_ENTRY1. In this case, during the recovery for the SPO, the flash translation layer 220 of FIG. 4 may receive the first map segment MAP_SEGMENT1 including the first map entry MAP_ENTRY1 among the map segments MAP_SEGMENT included in each of the map data MAP_DATA from the memory device 100 of FIG. 4 and output the first map segment MAP_SEGMENT1 to the host 300 of FIG. 4. The host 300 of FIG. 4 may receive the first map segment MAP_SEGMENT1 and store the first map segment MAP_SEGMENT1 in the host memory buffer.

As a result, the map segment MAP_SEGMENT used in the read operation of the memory controller 200 of FIG. 4 may be stored in the host 300 of FIG. 4. Therefore, during the read operation, an operation of searching for the PBA corresponding to the LBA or converting the LBA into the PBA may be omitted, and thus a read operation speed may be improved.

A method of selecting the map segment MAP_SEGMENT to be output to the host 300 of FIG. 4 is described with reference to the following drawing.

Figure 6:
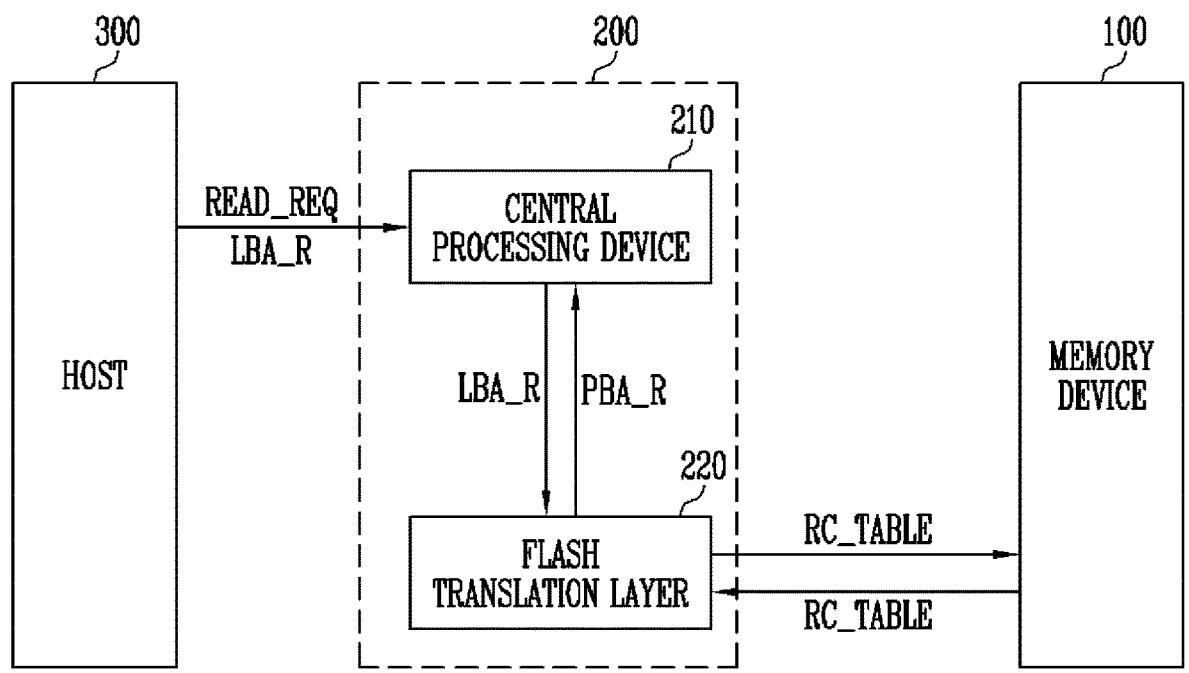
FIG. 6 is a diagram illustrating a method of selecting the map segment to be output to a host according to an embodiment of the present disclosure.

FIG. 6 is a diagram illustrating a method of selecting the map segment to be output to the host according to an embodiment of the present disclosure.

Referring to FIG. 6, FIG. 6 shows a method of selecting the map segment to be output to the host 300 among the map segments included in the map data output from the memory device 100, during the recovery after the SPO. The memory controller 200 of FIG. 6 may include the central processing device 210 and the flash translation layer 220.

In an embodiment, the central processing device 210 may receive the read request READ_REQ and the LBA LBA_R corresponding to the read request READ_REQ from the host 300. The read request READ_REQ may be the request instructing to read the data stored in the memory device 100.

When the central processing device 210 receives the read request READ_REQ and the LBA LBA_R from the host 300, the central processing device 210 may output the LBA LBA_R to the flash translation layer 220. The flash translation layer 220 may search for the map data MAP_DATA after receiving the LBA LBA_R.

Specifically, in order for the central processing device 210 to output the PBA corresponding to the LBA LBA_R to the memory device 100, the flash translation layer 220 may search for the map data MAP_DATA.

For example, the flash translation layer 220 may search for the MAP_DATA including the map entry MAP_ENTRY corresponding to the LBA LBA_R received from the host 300 among the map entries MAP_ENTRY included in each of the stored map data. The map entry MAP_ENTRY corresponding to the LBA LBA_R received from the host 300 may be data indicating the mapping relationship between the corresponding LBA LBA_R and the PBA.

In an embodiment, when the map data MAP_DATA including the map entry MAP_ENTRY corresponding to the LBA LBA_R received from the host 300 is stored in the flash translation layer 220, the flash translation layer 220 may output a PBA PBA_R included in the corresponding map data MAP_DATA to the central processing device 210.

In an embodiment, the flash translation layer 220 may include a read count table RC_TABLE. In the read count table RC_TABLE, a flag and the number of times the map entry MAP_ENTRY included in the map segment MAP_SEGMENT is called may be stored for each map segment MAP_SEGMENT.

Specifically, when the flash translation layer 220 outputs the map data MAP_DATA corresponding to the LBA LBA_R to the central processing device 210, the flash translation layer 220 may increase a read count of the map segment MAP_SEGMENT including the map entry MAP_ENTRY corresponding to the LBA LBA_R among the map segments included in the map data MAP_DATA.

In addition, the flash translation layer 220 may set a value of the flag corresponding to the map segment MAP_SEGMENT in the read count table RC_TABLE when the read count is equal to or greater than a reference value. The map segment MAP_SEGMENT in which the flag is set may be selected as the map segment to be output to the host 300.

In an embodiment, the read count table RC_TABLE included in the flash translation layer 220 may be output to and stored in the memory device 100 every preset period. At this time, the read count table RC_TABLE may be stored in a nonvolatile memory in the memory device 100. Therefore, the read count table RC_TABLE stored in the memory device 100 may be updated every preset period.

After the read count table RC_TABLE is stored in the memory device 100, during the recovery for the SPO, the memory device 100 may output the read count table RC_TABLE to the flash translation layer 220. The flash translation layer 220 may request the map segment MAP_SEGMENT to be output to the host 300 among the map segments MAP_SEGMENT to the memory device 100 by referring to the read count table RC_TABLE. Thereafter, the map segment MAP_SEGMENT output from the memory device 100 may be cached in a cache memory included in the memory controller 200 or in the flash translation layer 220, and the cached map segment MAP_SEGMENT may be output to and stored in the host 300.

As a result, during the recovery for the SPO, the map segment MAP_SEGMENT to be output to the host 300 may be selected through the read count or the flag stored in the read count table RC_TABLE. That is, among the map segments MAP_SEGMENT included in each of the map data MAP_DATA stored in the memory device 100, the map segment MAP_SEGMENT having the read count equal to or greater than the reference value, that is, the map segment MAP_SEGMENT in which the flag is set, may be output to and stored in the host 300.

The read count and the flag stored in the read count table RC_TABLE included in the flash translation layer 220 is described with reference to the following drawing.

FIGS. 7A and 7B illustrate the read count table RC_TABLE stored in the flash translation layer according to an embodiment of the present disclosure.

Referring to FIGS. 7A and 7B, FIG. 7A shows the read count READ_CNT stored in the read count table RC_TABLE included in the flash translation layer 220 of FIG. 6, and FIG. 7B shows the flag FLAG stored in the read count table RC_TABLE. The map data of FIGS. 7A and 7B may be data stored in the flash translation layer 220 of FIG. 6, and each of the map data may include a plurality of map segments, and each of the map segments may include a plurality of map entries.

In FIGS. 7A and 7B, the map data stored in the flash translation layer 220 of FIG. 6 may be first and second map data MAP_DATA1 and MAP_DATA2, the first map data MAP_DATA1 may include first and second map segments MAP_SEGMENT1 and MAP_SEGMENT2, and the second map data MAP_DATA2 may include third and fourth map segments MAP_SEGMENT3 and MAP_SEGMENT4. Each of the first to fourth map segment MAP_SEGMENT1 to 4 may include a plurality of map entries. Each of the plurality of map entries may be the data indicating the mapping relationship between the LBA and the PBA.

In an embodiment, the LBA LBA_R received together with the read request READ_REQ from the host 300 of FIG. 6 may be output to the flash translation layer 220 of FIG. 6 through the central processing device 210 of FIG. 6. When the flash translation layer 220 of FIG. 6 receives the LBA LBA_R, the flash translation layer 220 of FIG. 6 may search for the map entry indicating the mapping relationship between the LBA LBA_R received from the host 300 of FIG. 6 and the PBA among the stored map data.

In FIG. 7A, when any of the map entries included in the map segment is searched, the read count READ_CNT corresponding to the map segment including the corresponding map entry may be increased. That is, the read count READ_CNT may indicate the number of times the map entries included in the map segment are searched.

For example, in FIG. 7A, the number of searches of the map entries included in the first map segment MAP_SEGMENT1 may be '1000', the number of searches of the map entries included in the second map segment MAP_SEGMENT2 may be '500', the number of searches of the map entries included in the third map segment MAP_SEGMENT3 may be '1500', and the number of searches of the map entries included in the fourth map segment MAP_SEGMENT4 may be '2000'.

Therefore, the read count READ_CNT corresponding to the first map segment MAP_SEGMENT1 may be '1000', the read count READ_CNT corresponding to the second map segment MAP_SEGMENT2 may be '500', the read count READ_CNT corresponding to the third map segment MAP_SEGMENT3 may be 1500', and the read count READ_CNT corresponding to the fourth map segment MAP_SEGMENT4 may be '2000'.

In an embodiment, when the read count READ_CNT corresponding to the map segment MAP_SEGMENT is equal to or greater than the reference value, the flag FLAG corresponding to the map segment MAP_SEGMENT may be set in the read count table RC_TABLE. At this time, a default value of the flag FLAG may be '0', and when the read count READ_CNT is equal to or greater than the reference value, the flag FLAG may be set to '1'.

In FIGS. 7A and 7B, the reference value is '2000'.

Therefore, in FIG. 7B, since the read count READ_CNT corresponding to the fourth map segment MAP_SEGMENT4 is '2000', the flag FLAG corresponding to the fourth map segment MAP_SEGMENT4 may be set to '1'.

In an embodiment, the read count table RC_TABLE in which the read count READ_CNT and the flag FLAG are stored may be output to and stored in the memory device 100 of FIG. 6 every preset period. At this time, the read count table RC_TABLE may be stored in the nonvolatile memory in the memory device 100 of FIG. 6. Therefore, the read count table RC_TABLE stored in the memory device 100 of FIG. 6 may be updated every preset period.

In addition, the read count table RC_TABLE stored in the memory device 100 of FIG. 6 may be output to the flash translation layer 220 of FIG. 6 during the recovery after the SPO. The flash translation layer 220 of FIG. 6 may request the map segment to the memory device 100 of FIG. 6 based on the read count READ_CNT or the flag FLAG stored in the read count table RC_TABLE.

Referring to FIGS. 7A and 7B, since the read count READ_CNT of the fourth map segment MAP_SEGMENT4 is '2000' and the flag FLAG of the fourth map segment MAP_SEGMENT4 is '1', the flash translation layer 220 of FIG. 6 may request an output of the fourth map segment MAP_SEGMENT4 to the memory device 100 of FIG. 6 during the recovery after the SPO. The fourth map segment MAP_SEGMENT4 output from the memory device 100 of FIG. 6 may be output to and stored in the host 300 of FIG. 6 through the flash translation layer 220 of FIG. 6 and the central processing device 210 of FIG. 6.

Figure 8:
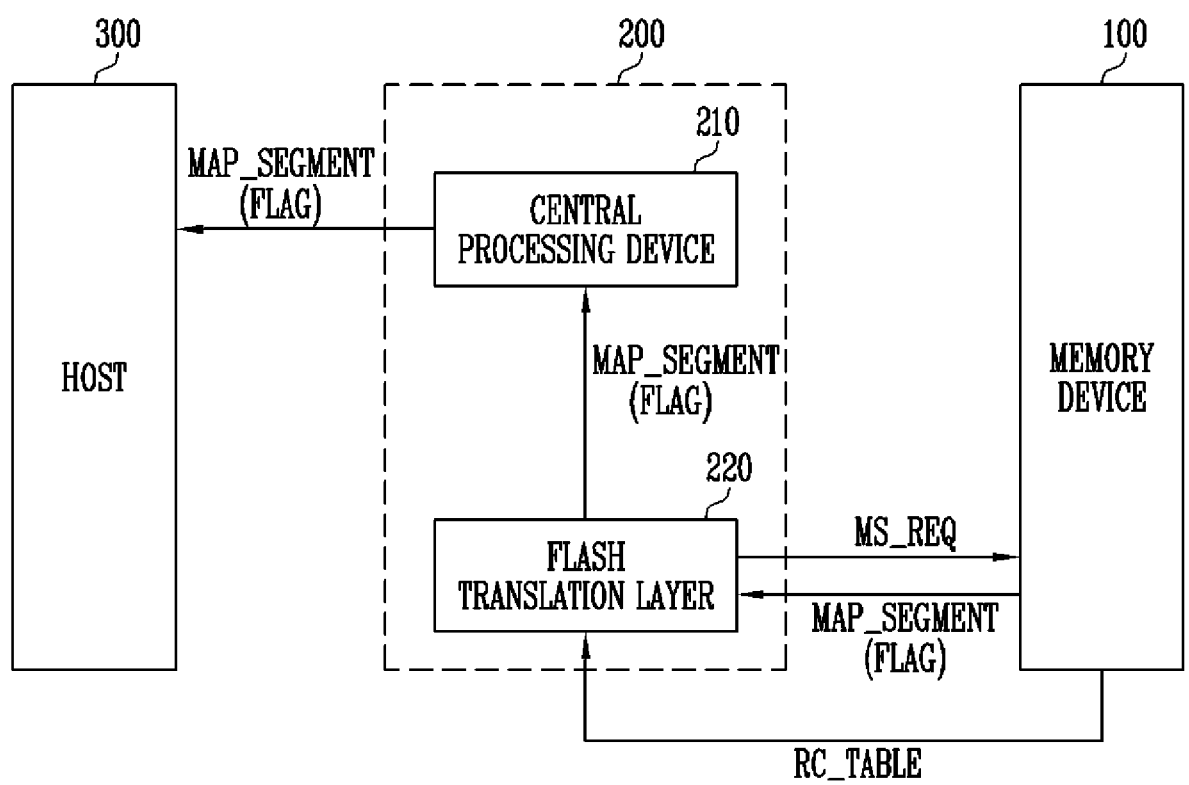
FIG. 8 illustrates an embodiment of the present disclosure in which the map segment is output to a host during recovery after a sudden power off (SPO) occurs.

FIG. 8 illustrates an embodiment of the present disclosure in which the map segment is output to the host during the recovery after the SPO occurs.

Referring to FIG. 8, FIG. 8 shows a process in which the map segment MAP_SEGMENT output from the memory device 100 is output to the host 300 during the recovery for the SPO after the map data MAP_DATA is output to the memory device 100 during the SPO. The memory controller 200 of FIG. 8 may include the central processing device 210 and the flash translation layer 220.

In an embodiment, the SPO may occur. When the SPO occurs, the map data MAP_DATA stored in the flash translation layer 220 may be output to and stored in the memory device 100 to prevent loss of the map data MAP_DATA stored in the flash translation layer 220.

Thereafter, during the recovery for the SPO, the flash translation layer 220 may receive the read count table RC_TABLE stored in the memory device 100. The read count table RC_TABLE may be a table in which the read count READ_CNT and the flag FLAG are stored, and may be stored in the memory device 100 every preset period. The read count READ_CNT may indicate the number of times the map entries included in the map segment MAP_SEGMENT are searched, and the flag FLAG may indicate that the read count READ_CNT is equal to or greater than the reference value.

The flash translation layer 220 may receive the read count table RC_TABLE and select the map segment MAP_SEGMENT to be output to the host 300. Specifically, the map segment MAP_SEGMENT in which the read count READ_CNT included in the read count table RC_TABLE is equal to or greater than the reference value or flag FLAG included in the read count table RC_TABLE is set to '1' may be selected as the map segment MAP_SEGMENT to be output to the host 300.

When the map segment MAP_SEGMENT to be output to the host 300 is selected, the flash translation layer 220 may output a map segment request MS_REQ requesting an output of the corresponding map segment MAP_SEGMENT to the memory device 100. At this time, the flash translation layer 220 may read the map segment MAP_SEGMENT through the read request.

The memory device 100 may output the map segment MAP_SEGMENT to the flash translation layer 220 in response to the map segment request MS_REQ or the read request. At this time, the flag corresponding to the map segment MAP_SEGMENT may be set to '1'.

In an embodiment, when the flash translation layer 220 receives the map segment MAP_SEGMENT from the memory device 100, the flash translation layer 220 may output the map segment MAP_SEGMENT to the host 300 through the central processing device 210. The host 300 may store the received map segment MAP_SEGMENT.

Therefore, the map segment MAP_SEGMENT including the map entry that is frequently output to the host 300 may be output to and stored in the host 300. When the map segment MAP_SEGMENT is stored in the host 300, thereafter, during the read operation, the host 300 may determine whether the map segment MAP_SEGMENT including the map entry corresponding to the LBA is stored before outputting the read request and the LBA.

When the map segment MAP_SEGMENT including the map entry corresponding to the LBA is stored in the host 300, the host 300 may output the PBA indicated by the map entry to the memory controller 200. However, when the map segment MAP_SEGMENT including the map entry corresponding to the LBA is not stored in the host 300, the host 300 may output the LBA to the memory controller 200.

As a result, the map segment MAP_SEGMENT including the map entry frequently output to the host 300 may be stored in the host 300. Therefore, an operation of searching for the PBA corresponding to the LBA or converting the LBA into the PBA may be omitted, and thus performance of the read operation may be improved.

In addition, the map segment MAP_SEGMENT output to the host 300 may not be included in the map data MAP_DATA stored in the flash translation layer 220. That is, since the map segment MAP_SEGMENT stored in the host 300 is not required to be stored in the flash translation layer 220, the map segment MAP_SEGMENT may be excluded from the map data MAP_DATA stored in the flash translation layer 220. Therefore, a size of the map data MAP_DATA that may be stored in the flash translation layer 220 may be increased.

Figure 9:
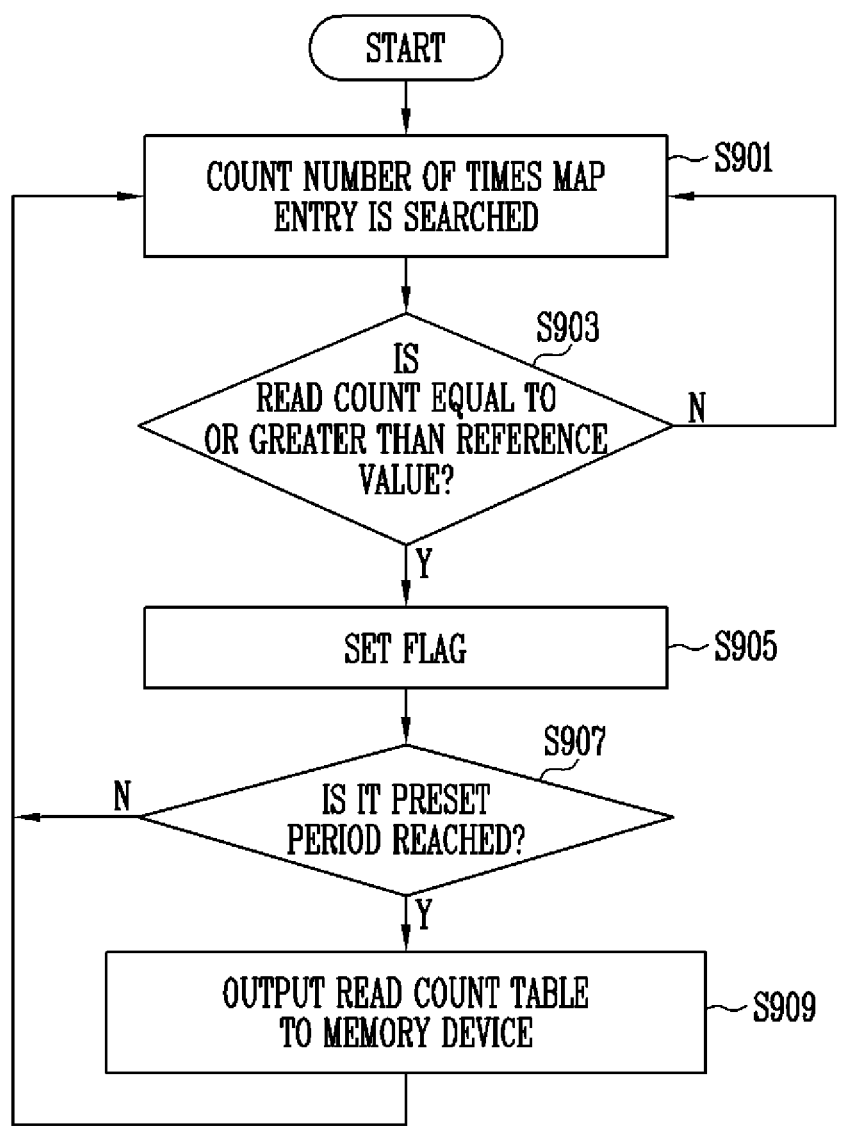
FIG. 9 is a diagram illustrating an operation of a memory controller according to an embodiment of the present disclosure.

FIG. 9 is a diagram illustrating an operation of a memory controller according to an embodiment of the present disclosure.

Referring to FIG. 9, in operation S901, the memory controller may count the number of times the map entry is searched. Specifically, the memory controller may search for the map entry indicating the mapping relationship between the LBA and the PBA in order to output the PBA having the mapping relationship with the LBA received from the host together with the read request to the memory device. When the map entry is searched, the memory controller may increase the read count corresponding to the map segment including the map entry. The read count may be stored in the read count table.

In operation S903, the memory controller may determine whether the read count corresponding to the map segment is equal to or greater than the reference value. When the read count corresponding to the map segment is equal to or greater than the reference value (Y), the operation may proceed to operation S905 to set the flag corresponding to the map segment. The flag may be stored in the read count table. When the read count corresponding to the map segment is less than the reference value (N), the operation may proceed to operation S901 again to count the number of times the map entry is searched.

In an embodiment, when the flag corresponding to the map segment is set, the corresponding map segment may be selected as the map segment to be output to the host. When the map segment to be output to the host is selected, during the recovery after the SPO, the memory controller may receive the map segment from the memory device and output the map segment to the host.

In operation S907, the memory controller may determine whether a preset period is reached.

When the preset period is reached (Y), the memory controller may proceed to operation S909 to output the read count table to the memory device, and the memory device may store the read count table. The read count table may include the read count and the flag corresponding to the map segment. That is, every preset period, the memory device may update the read count table by outputting the read count table to the memory device.

When the preset period is not reached (N), the operation may proceed to operation S901 again, and the memory controller may count the number of times the map entry is searched.

Figure 10:
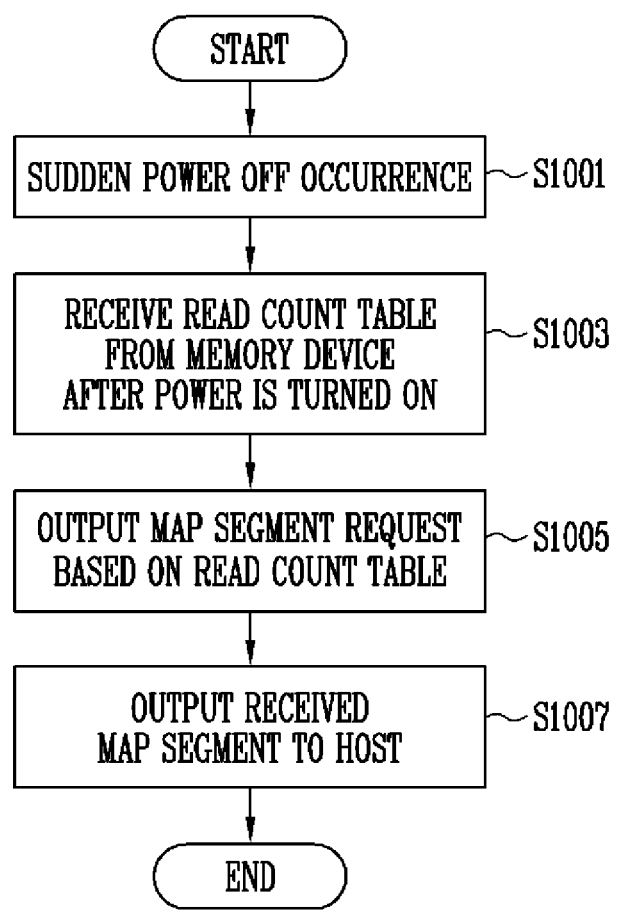
FIG. 10 is a diagram illustrating an operation of a memory controller according to an embodiment of the present disclosure.

FIG. 10 is a diagram illustrating an operation of a memory controller according to an embodiment of the present disclosure.

Referring to FIG. 10, the SPO may occur in operation S1001. When the SPO occurs, the map data stored in the memory controller may be output to and stored in the memory device.

In operation S1003, the memory controller may receive the read count table from the memory device after power is turned on. The read count table may include the read count and the flag corresponding to the map segment. The read count may indicate the number of times map entries included in the map segment are searched, and the flag may indicate that the read count corresponding to the map segment is equal to or greater than the reference value. The map entry may be data indicating the mapping relationship between the LBA and the PBA.

In operation S1005, the memory controller may output the map segment request to the memory device based on the read count table.

Specifically, in order to output the map segment in which the read count included in the read count table is equal to or greater than the reference value or the map segment in which the flag is set to the host, the memory controller may output the map segment request for obtaining the corresponding map segment. The memory device may output the map segment to the memory controller in response to the map segment request.

In operation S1007, when the memory controller receives the map segment from the memory device, the memory controller may output the received map segment to the host. The host may store the received map segment.

Thereafter, before the host outputs the read request and the LBA corresponding to the read request to the memory controller, the host may search for the map segment including the map entry corresponding to the LBA among the stored map segments. When the map segment including the map entry corresponding to the LBA is searched, the host may output the read request and the PBA indicated by the map entry to the memory controller.

Therefore, since an operation for the memory controller to search for the PBA corresponding to the LBA or an operation of converting the LBA into the PBA may be omitted, the time consumed for the read operation may be reduced. Since the time consumed for the read operation is reduced, the performance of the read operation may be improved.

Figure 11:
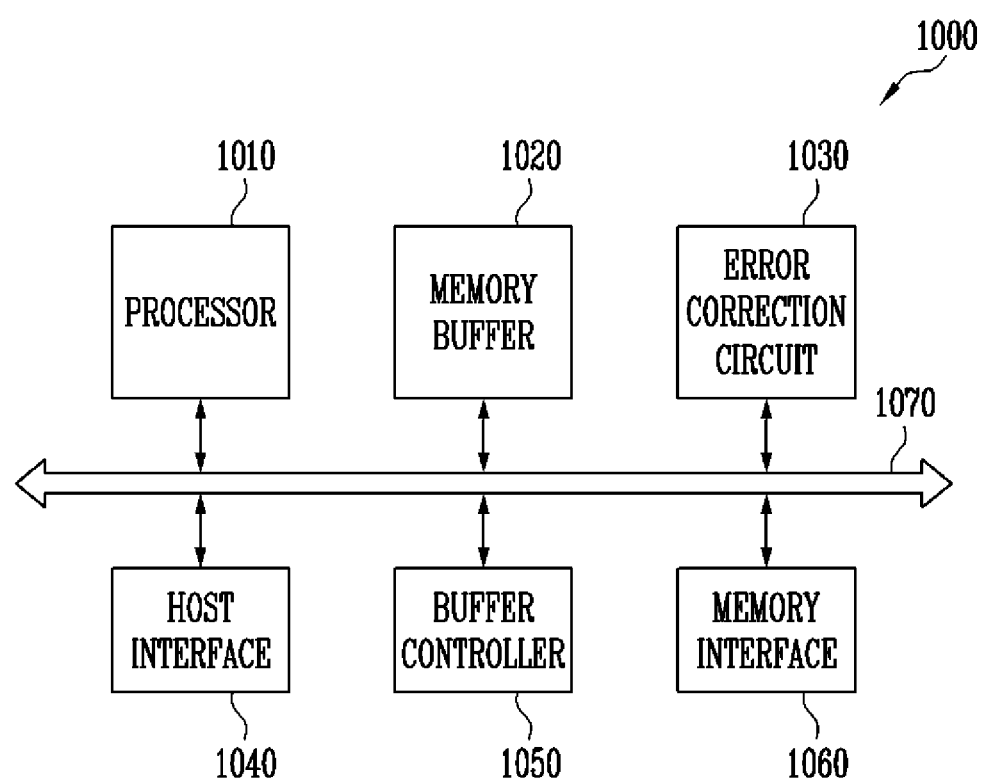
FIG. 11 is a diagram illustrating a memory controller of FIG. 1 according to an embodiment of the present disclosure.

FIG. 11 is a diagram illustrating the memory controller of FIG. 1 according to an embodiment of the present disclosure.

The memory controller 1000 is connected to a host and the memory device. The memory controller 1000 is configured to access the memory device in response to the request from the host. For example, the memory controller 1000 is configured to control write, read, erase, and background operations of the memory device. The memory controller 1000 is configured to provide an interface between the memory device and the host. The memory controller 1000 is configured to drive firmware for controlling the memory device.

Referring to FIG. 11, the memory controller 1000 may include a processor 1010, a memory buffer 1020, an error correction circuit (ECC) 1030, a host interface 1040, a buffer controller (or buffer control circuit) 1050, a memory interface 1060, and a bus 1070.

The bus 1070 may be configured to provide a channel between components of the memory controller 1000.

The processor 1010 may control overall operations of the memory controller 1000 and may perform a logical operation. The processor 1010 may communicate with an external host through the host interface 1040 and communicate with the memory device through the memory interface 1060. In addition, the processor 1010 may communicate with the memory buffer 1020 through the buffer controller 1050. The processor 1010 may control an operation of the storage device using the memory buffer 1020 as an operation memory, a cache memory, or a buffer memory.

The processor 1010 may perform a function of the FTL. The processor 1010 may convert the LBA provided by the host into the PBA through the FTL. The FTL may receive the LBA and convert the LBA into the PBA by using a mapping table. An address mapping method of the flash translation layer include a plurality of mapping methods according to a mapping unit. A representative address mapping method includes a page mapping method, a block mapping method, and a hybrid mapping method.

The processor 1010 is configured to randomize data received from the host. For example, the processor 1010 may randomize the data received from the host using a randomizing seed. The randomized data is provided to the memory device as data to be stored and is programmed to the memory cell array.

The processor 1010 may perform the randomization and the de-randomization by driving software or firmware.

The memory buffer 1020 may be used as an operation memory, a cache memory, or a buffer memory of the processor 1010. The memory buffer 1020 may store codes and commands executed by the processor 1010. The memory buffer 1020 may store data processed by the processor 1010. The memory buffer 1020 may include a static RAM (SRAM) or a dynamic RAM (DRAM).

The error correction circuit 1030 may perform error correction. The error correction circuit 1030 may perform error correction encoding (ECC encoding) based on data to be written to the memory device through memory interface 1060. The error correction encoded data may be transferred to the memory device through the memory interface 1060. The error correction circuit 1030 may perform error correction decoding (ECC decoding) on the data received from the memory device through the memory interface 1060. For example, the error correction circuit 1030 may be included in the memory interface 1060 as a component of the memory interface 1060.

The host interface 1040 is configured to communicate with an external host under control of the processor 1010. The host interface 1040 may be configured to perform communication using at least one of various communication standards or interfaces such as a universal serial bus (USB), a serial AT attachment (SATA), a serial attached SCSI (SAS), a high speed interchip (HSIC), a small computer system interface (SCSI), a peripheral component interconnection express (PCI express), a nonvolatile memory express (NVMe), a universal flash storage (UFS), a secure digital (SD), a multimedia card (MMC), an embedded MMC (eMMC), a dual in-line memory module (DIMM), a registered DIMM (RDIMM), and a load reduced DIMM (LRDIMM).

The buffer controller 1050 is configured to control the memory buffer 1020 under the control of the processor 1010.

The memory interface 1060 is configured to communicate with the memory device under the control of the processor 1010. The memory interface 1060 may communicate a command, an address, and data with the memory device through a channel.

For example, the memory controller 1000 may not include the memory buffer 1020 and the buffer controller 1050.

For example, the processor 1010 may control the operation of the memory controller 1000 using codes. The processor 1010 may load the codes from a nonvolatile memory device (for example, a read only memory) provided inside the memory controller 1000. As another example, the processor 1010 may load the codes from the memory device through the memory interface 1060.

For example, the bus 1070 of the memory controller 1000 may be divided into a control bus and a data bus. The data bus may be configured to transmit data within the memory controller 1000 and the control bus may be configured to transmit control information such as a command and an address within the memory controller 1000. The data bus and the control bus may be separated from each other and may not interfere with each other or affect each other. The data bus may be connected to the host interface 1040, the buffer controller 1050, the error correction circuit 1030, and the memory interface 1060. The control bus may be connected to the host interface 1040, the processor 1010, the buffer controller 1050, the memory buffer 1020, and the memory interface 1060.

In an embodiment, the processor 1010 may receive the read request and the LBA corresponding to the read request from the host 300 of FIG. 1. After receiving the read request and the LBA, the processor 1010 may determine whether the map data including the map entry corresponding to the LBA is stored in the processor 1010 or the memory buffer 1020. The map data may be configured of a plurality of map segments, and the map segment may be configured of a plurality of map entries. At this time, the map entry may be data indicating the mapping relationship between the LBA and the PBA.

In an embodiment, the processor 1010 may include the read count table. The read count table may include the read count and the flag corresponding to the map segment. After searching for the map entry corresponding to the LBA, the processor 1010 may increase the read count of the map segment including the map entry or set the flag corresponding to the map segment.

Specifically, when the map segment including the map entry corresponding to the LBA received from the host 300 of FIG. 1 is stored in the processor 1010 or the memory buffer 1020, the processor 1010 may increase the read count corresponding to the corresponding map segment. In addition, the processor 1010 may set the flag corresponding to the map segment when the read count corresponding to the corresponding map segment is equal to or greater than the reference value.

In an embodiment, the processor 1010 may output the read count table to the memory device 100 of FIG. 1 to store the read count table in the memory device 100 of FIG. 1 every preset period. That is, the read count table stored in the memory device 100 of FIG. 1 may be updated every preset period.

In an embodiment, when the SPO occurs while the memory device 100 of FIG. 1 is operating, the map data stored in the processor 1010 and/or the memory buffer 1020 may be output to and stored in the memory device 100 of FIG. 1.

Thereafter, during the recovery for the SPO, the processor 1010 may receive the read count table from the memory device 100 of FIG. 1. The processor 1010 may perform an operation of outputting the map segment corresponding to the read count equal to or greater than the reference value among the read counts included in the read count table or the map segment in which the flag is set to the host 300 of FIG. 1. For example, the processor 1010 may output the map segment request to the memory device 100 of FIG. 1 in order to output the map segment to the host 300 of FIG. 1. The memory device 100 of FIG. 1 may output the corresponding map segment to the processor 1010 in response to the map segment request.

The processor 1010 may receive the map segment corresponding to the read count equal to or greater than the reference value or the map segment in which the flag is set from the memory device 100 of FIG. 1 and output the received map segment to the host 300 of FIG. 1, and the host 300 of FIG. 1 may store the received map segment in a host memory buffer.

As a result, the map segment including the map entry frequently output from the host 300 of FIG. 1 may be stored in the host memory buffer. Therefore, the processor 1010 may omit an operation of searching for the map data for outputting the PBA corresponding to the LBA or converting the LBA into the PBA. Thus, the time consumed for the read operation may be shortened.

Figure 12:
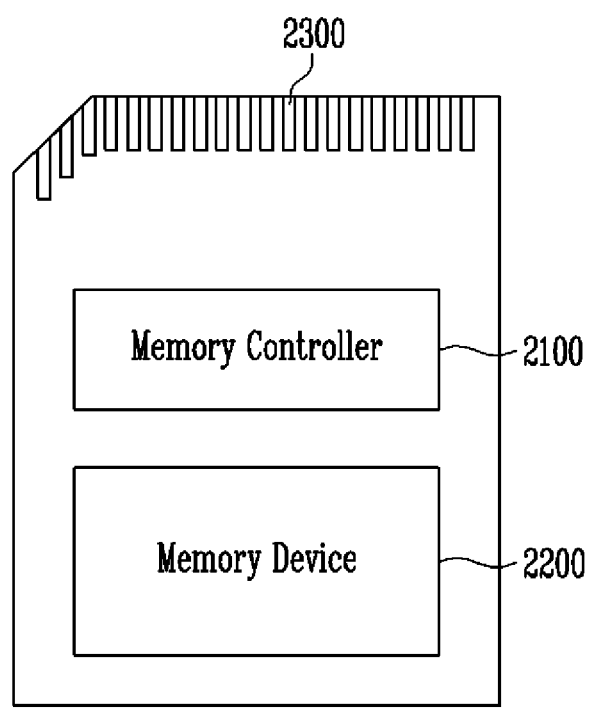
FIG. 12 is a block diagram illustrating a memory card system to which a storage device according to an embodiment of the present disclosure is applied.

FIG. 12 is a block diagram illustrating a memory card system to which the storage device according to an embodiment of the present disclosure is applied.

Referring to FIG. 12, the memory card system 2000 includes a memory controller 2100, a memory device 2200, and a connector 2300.

The memory controller 2100 is connected to the memory device 2200. The memory controller 2100 is configured to access the memory device 2200. For example, the memory controller 2100 is configured to control read, write, erase, and background operations of the memory device 2200. The memory controller 2100 is configured to provide an interface between the memory device 2200 and the host. The memory controller 2100 is configured to drive firmware for controlling the memory device 2200. The memory device 2200 may be implemented identically to the memory device 100 of FIG. 1 described with reference to FIG. 1.

As an example, the memory controller 2100 may include components such as a random access memory (RAM), a processor, a host interface, a memory interface, and an error correction circuit.

The memory controller 2100 may communicate with an external device through the connector 2300. The memory controller 2100 may communicate with an external device (for example, the host) according to a specific communication standard. As an example, the memory controller 2100 is configured to communicate with an external device through at least one of various communication standards such as a universal serial bus (USB), a multi-media card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe. As an example, the connector 2300 may be defined by at least one of the various communication standards described above.

As an example, the memory device 2200 may be implemented as various nonvolatile memory elements such as an electrically erasable and programmable ROM (EEPROM), a NAND flash memory, a NOR flash memory, a phase-change RAM (PRAM), a resistive RAM (ReRAM), a ferroelectric RAM (FRAM), and a spin transfer torque magnetic RAM (STT-MRAM).

The memory controller 2100 and the memory device 2200 may be integrated into one semiconductor device to configure a memory card. For example, the memory controller 2100 and the memory device 2200 may be integrated into one semiconductor device to configure a memory card such as a PC card (personal computer memory card international association (PCMCIA)), a compact flash card (CF), a smart media card (SM or SMC), a memory stick, a multimedia card (MMC, RS-MMC, MMCmicro, or eMMC), an SD card (SD, miniSD, microSD, or SDHC), and a universal flash storage (UFS).

In an embodiment, the memory controller 2100 may receive the read request and the LBA corresponding to the read request from the host 300 of FIG. 1. After receiving the read request and the LBA, the memory controller 2100 may determine whether the map data including the map entry corresponding to the LBA is stored in the memory controller 2100. The map data may be configured of a plurality of map segments, and the map segment may be configured of a plurality of map entries. At this time, the map entry may be data indicating the mapping relationship between the LBA and the PBA.

In an embodiment, the memory controller 2100 may include the read count table. The read count table may include the read count and the flag corresponding to the map segment. After searching for the map entry corresponding to the LBA, the memory controller 2100 may increase the read count of the map segment including the map entry or set the flag corresponding to the map segment.

Specifically, when the map segment including the map entry corresponding to the LBA received from the host 300 of FIG. 1 is stored in the memory controller 2100, the memory controller 2100 may increase the read count corresponding to the corresponding map segment. In addition, the memory controller 2100 may set the flag corresponding to the map segment when the read count corresponding to the corresponding map segment is equal to or greater than the reference value.

In an embodiment, the memory controller 2100 may output the read count table to the memory device 2200 to store the read count table in the memory device 2200 every preset period. That is, the read count table stored in the memory device 2200 may be updated every preset period.

In an embodiment, when the SPO occurs while the memory device 2200 is operating, the map data stored in the memory controller 2100 may be output to and stored in the memory device 2200.

Thereafter, during the recovery for the SPO, the memory controller 2100 may receive the read count table from the memory device 2200. The memory controller 2100 may perform an operation of outputting the map segment corresponding to the read count equal to or greater than the reference value among the read counts included in the read count table or the map segment in which the flag is set to the host 300 of FIG. 1. For example, the memory controller 2100 may output the map segment request to the memory device 2200 in order to output the map segment to the host 300 of FIG. 1. The memory device 2200 may output the corresponding map segment to the memory controller 2100 in response to the map segment request.

The memory controller 2100 may receive the map segment corresponding to the read count equal to or greater than the reference value or the map segment in which the flag is set from the memory device 2200 and output the received map segment to the host 300 of FIG. 1, and the host 300 of FIG. 1 may store the received map segment in a host memory buffer.

As a result, the map segment including the map entry frequently output from the host 300 of FIG. 1 may be stored in the host memory buffer. Therefore, the memory controller 2100 may omit an operation of searching for the map data for outputting the PBA corresponding to the LBA or converting the LBA into the PBA. Thus, the time consumed for the read operation may be shortened.

Figure 13:
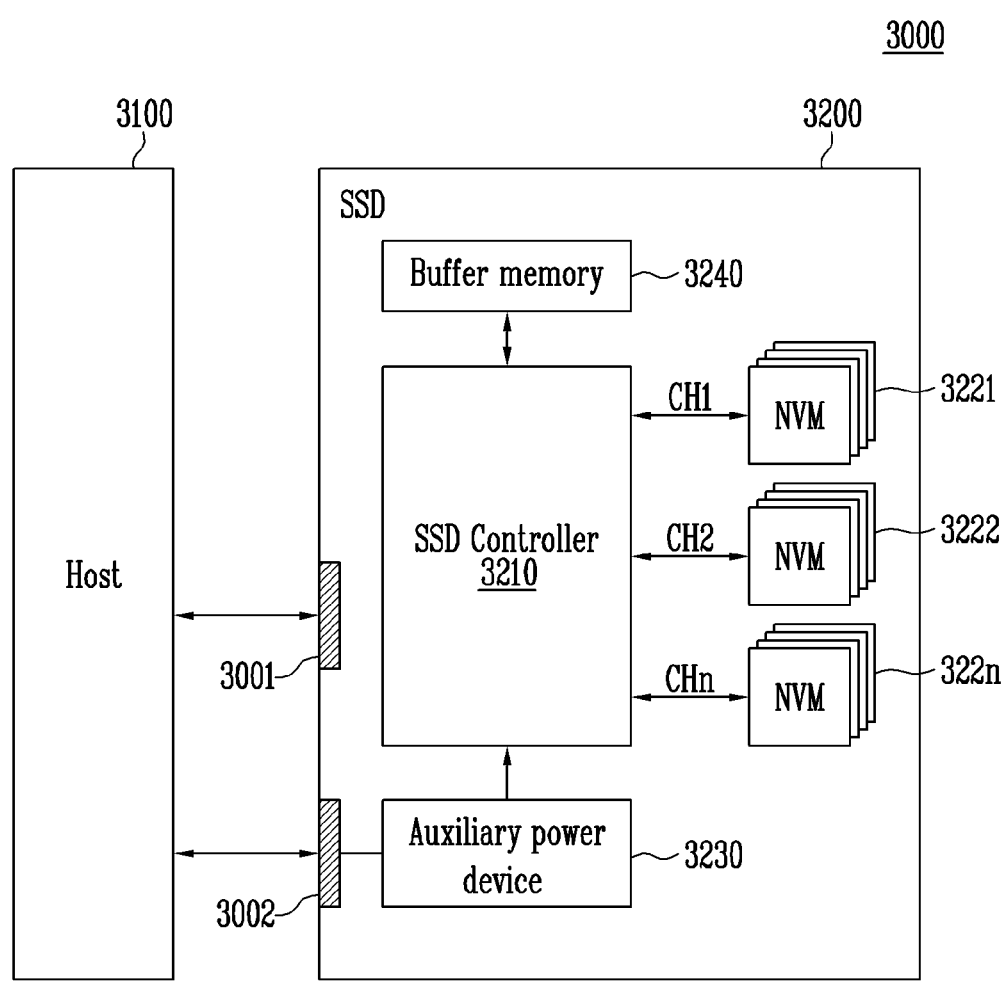
FIG. 13 is a block diagram exemplary illustrating a solid state drive (SSD) system to which a storage device according to an embodiment of the present disclosure is applied.

FIG. 13 is a block diagram exemplary illustrating a solid state drive (SSD) system to which the storage device according to an embodiment of the present disclosure is applied.

Referring to FIG. 13, the SSD system 3000 includes a host 3100 and an SSD 3200. The SSD 3200 exchanges a signal SIG with the host 3100 through a signal connector 3001 and receives power PWR through a power connector 3002. The SSD 3200 includes an SSD controller 3210, a plurality of flash memories 3221 to 322n, an auxiliary power device 3230, and a buffer memory 3240.

In an embodiment, the SSD controller 3210 may perform a function of the memory controller 200 of FIG. 1 described with reference to FIG. 1.

The SSD controller 3210 may control the plurality of flash memories 3221 to 322n in response to the signal SIG received from the host 3100. As an example, the signal SIG may be signals based on an interface between the host 3100 and the SSD 3200. For example, the signal SIG may be a signal defined by at least one of communication standards or interfaces such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe.

The auxiliary power device 3230 is connected to the host 3100 through the power connector 3002. The auxiliary power device 3230 may receive the power PWR from the host 3100 and may charge the power. The auxiliary power device 3230 may provide power of the SSD 3200 when power supply from the host 3100 is not smooth. As an example, the auxiliary power device 3230 may be positioned in the SSD 3200 or may be positioned outside the SSD 3200. For example, the auxiliary power device 3230 may be positioned on a main board and may provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or may temporarily store metadata (for example, a mapping table) of the flash memories 3221 to 322n. The buffer memory 3240 may include a volatile memory such as a DRAM, an SDRAM, a DDR SDRAM, an LPDDR SDRAM, and a GRAM, or a nonvolatile memory such as an FRAM, a ReRAM, an STT-MRAM, and a PRAM.

In an embodiment, the SSD controller 3210 may receive the read request and the LBA corresponding to the read request from the host 3100. After receiving the read request and the LBA, the SSD controller 3210 may determine whether the map data including the map entry corresponding to the LBA is stored in the SSD controller 3210 or the buffer memory 3240. The map data may be configured of a plurality of map segments, and the map segment may be configured of a plurality of map entries. At this time, the map entry may be data indicating the mapping relationship between the LBA and the PBA.

In an embodiment, the SSD controller 3210 may include the read count table. The read count table may include the read count and the flag corresponding to the map segment. After searching for the map entry corresponding to the LBA, the SSD controller 3210 may increase the read count of the map segment including the map entry or set the flag corresponding to the map segment.

Specifically, when the map segment including the map entry corresponding to the LBA received from the host 3100 is stored in the SSD controller 3210 or the buffer memory 3240, the SSD controller 3210 may increase the read count corresponding to the corresponding map segment. In addition, the SSD controller 3210 may set the flag corresponding to the map segment when the read count corresponding to the corresponding map segment is equal to or greater than the reference value.

In an embodiment, the SSD controller 3210 may output the read count table to the plurality of flash memories 3221 to 322n to store the read count table in the plurality of flash memories 3221 to 322n every preset period. That is, the read count table stored in any of the plurality of flash memories 3221 to 322n may be updated every preset period.

In an embodiment, when the SPO occurs while the plurality of flash memories 3221 to 322n are operating, the map data stored in the SSD controller 3210 and/or the buffer memory 3240 may be output to and stored in the plurality of flash memories 3221 to 322n.

Thereafter, during the recovery for the SPO, the SSD controller 3210 may receive the read count table from the plurality of flash memories 3221 to 322n. The SSD controller 3210 may perform an operation of outputting the map segment corresponding to the read count equal to or greater than the reference value among the read counts included in the read count table or the map segment in which the flag is set to the host 3100. For example, the SSD controller 3210 may output the map segment request to the plurality of flash memories 3221 to 322n in order to output the map segment to the host 3100. The plurality of flash memories 3221 to 322n may output the corresponding map segment to the SSD controller 3210 in response to the map segment request.

The SSD controller 3210 may receive the map segment corresponding to the read count equal to or greater than the reference value or the map segment in which the flag is set from the plurality of flash memories 3221 to 322n and output the received map segment to the host 3100, and the host 3100 may store the received map segment in a host memory buffer.

As a result, the map segment including the map entry frequently output from the host 3100 may be stored in the host memory buffer. Therefore, the SSD controller 3210 may omit an operation of searching for the map data for outputting the PBA corresponding to the LBA or converting the LBA into the PBA. Thus, the time consumed for the read operation may be shortened.

Figure 14:
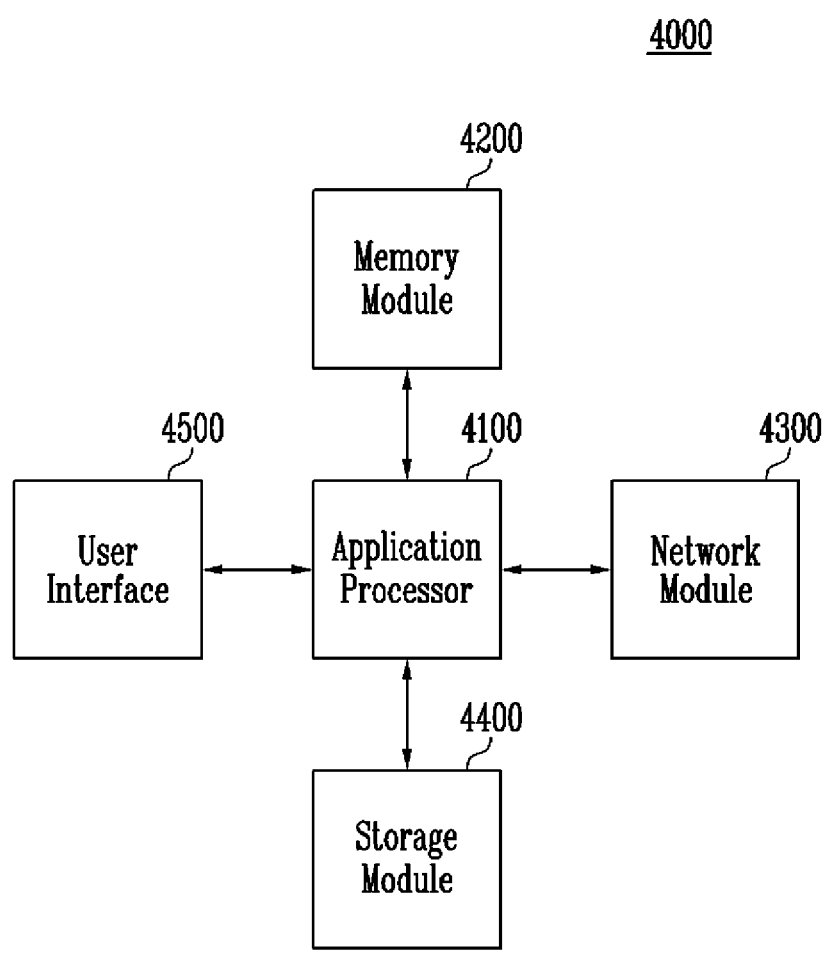
FIG. 14 is a block diagram illustrating a user system to which a storage device according to an embodiment of the present disclosure is applied.

FIG. 14 is a block diagram illustrating a user system to which the storage device according to an embodiment of the present disclosure is applied.

Referring to FIG. 14, the user system 4000 includes an application processor 4100, a memory module 4200, a network module 4300, a storage module 4400, and a user interface 4500.

The application processor 4100 may drive components, an operating system (OS), a user program, or the like included in the user system 4000. For example, the application processor 4100 may include controllers, interfaces, graphics engines, and the like that control the components included in the user system 4000. The application processor 4100 may be provided as a system-on-chip (SoC).

The memory module 4200 may operate as a main memory, an operation memory, a buffer memory, or a cache memory of the user system 4000. The memory module 4200 may include a volatile random access memory such as a DRAM, an SDRAM, a DDR SDRAM, a DDR2 SDRAM, a DDR3 SDRAM, an LPDDR SDARM, an LPDDR2 SDRAM, and an LPDDR3 SDRAM, or a nonvolatile random access memory, such as a PRAM, a ReRAM, an MRAM, and an FRAM. For example, the application processor 4100 and memory module 4200 may be packaged based on a package on package (POP) and provided as one semiconductor package.

The network module 4300 may communicate with external devices. For example, the network module 4300 may support wireless communication such as code division multiple access (CDMA), global system for mobile communications (GSM), wideband CDMA (WCDMA), CDMA-2000, time division multiple access (TDMA), long term evolution, Wimax, WLAN, UWB, Bluetooth, and WI-FI. For example, the network module 4300 may be included in the application processor 4100.

The storage module 4400 may store data. For example, the storage module 4400 may store data received from the application processor 4100. Alternatively, the storage module 4400 may transmit data stored in the storage module 4400 to the application processor 4100. For example, the storage module 4400 may be implemented as a nonvolatile semiconductor memory element such as a phase-change RAM (PRAM), a magnetic RAM (MRAM), a resistive RAM (RRAM), a NAND flash, a NOR flash, and a three-dimensional NAND flash. For example, the storage module 4400 may be provided as a removable storage device (removable drive), such as a memory card, and an external drive of the user system 4000.

For example, the storage module 4400 may include a plurality of nonvolatile memory devices, and the plurality of nonvolatile memory devices may operate identically to the memory device described with reference to FIGS. 2 and 3. The storage module 4400 may operate identically to the storage device 50 described with reference to FIG. 1.

The user interface 4500 may include interfaces for inputting data or an instruction to the application processor 4100 or for outputting data to an external device. For example, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric element. The user interface 4500 may include user output interfaces such as a liquid crystal display (LCD), an organic light emitting diode (OLED) display device, an active matrix OLED (AMOLED) display device, an LED, a speaker, and a monitor.

In an embodiment, the application processor 4100 may receive the read request and the LBA corresponding to the read request from the host 300 of FIG. 1. After receiving the read request and the LBA, the application processor 4100 may determine whether the map data including the map entry corresponding to the LBA is stored in the application processor 4100 or the memory module 4200. The map data may be configured of a plurality of map segments, and the map segment may be configured of a plurality of map entries. At this time, the map entry may be data indicating the mapping relationship between the LBA and the PBA.

In an embodiment, the application processor 4100 may include the read count table. The read count table may include the read count and the flag corresponding to the map segment. After searching for the map entry corresponding to the LBA, the application processor 4100 may increase the read count of the map segment including the map entry or set the flag corresponding to the map segment.

Specifically, when the map segment including the map entry corresponding to the LBA received from the host 300 of FIG. 1 is stored in the application processor 4100 or the memory module 4200, the application processor 4100 may increase the read count corresponding to the corresponding map segment. In addition, the application processor 4100 may set the flag corresponding to the map segment when the read count corresponding to the corresponding map segment is equal to or greater than the reference value.

In an embodiment, the application processor 4100 may output the read count table to the storage module 4400 to store the read count table in the storage module 4400 every preset period. That is, the read count table stored in the storage module 4400 may be updated every preset period.

In an embodiment, when the SPO occurs while the storage module 4400 is operating, the map data stored in the application processor 4100 and/or the memory module 4200 may be output to and stored in the storage module 4400.

Thereafter, during the recovery for the SPO, the application processor 4100 may receive the read count table from the storage module 4400. The application processor 4100 may perform an operation of outputting the map segment corresponding to the read count equal to or greater than the reference value among the read counts included in the read count table or the map segment in which the flag is set to the host 300 of FIG. 1. For example, the application processor 4100 may output the map segment request to the storage module 4400 in order to output the map segment to the host 300 of FIG. 1. The storage module 4400 may output the corresponding map segment to the application processor 4100 in response to the map segment request.

The application processor 4100 may receive the map segment corresponding to the read count equal to or greater than the reference value or the map segment in which the flag is set from the storage module 4400 and output the received map segment to the host 300 of FIG. 1, and the host 300 of FIG. 1 may store the received map segment in a host memory buffer.

As a result, the map segment including the map entry frequently output from the host 300 of FIG. 1 may be stored in the host memory buffer. Therefore, the application processor 4100 may omit an operation of searching for the map data for outputting the PBA corresponding to the LBA or converting the LBA into the PBA. Thus, the time consumed for the read operation may be shortened.

Although various embodiments of the disclosed technology have been described with particular specifics and varying details for illustrative purposes, those skilled in the art will appreciate that various modifications, additions and substitutions may be made based on what is disclosed or illustrated in the present disclosure. Therefore, the present disclosure is not restricted to the above-described embodiments and many variations are possible within the spirit and scope of the present disclosure and the following claims. Further, the embodiments may be combined to form additional embodiments.

What is claimed is:

1. A memory controller that controls a memory device, the memory controller comprising:
    a central processing device configured to receive a read request from a host and perform an operation for outputting data corresponding to the read request to the host; and
    a flash translation layer configured to:
    search for a map entry indicating a mapping relationship between a logical block address and a physical block address by receiving the logical block address corresponding to the read request from the central processing device,
    store a read count table based on a result of searching for the map entry,
    increase a read count included in the read count table each time the map entry is searched, and
    select a map segment including the map entry to be output to a host memory buffer included in the host based on the read count,
    wherein the flash translation layer is further configured to:
    receive the read count table from the memory device, and
    select the map segment corresponding to the read count which is equal to or greater than a reference value.

2. The memory controller of claim 1, wherein the flash translation layer is further configured to increase the read count corresponding to the map segment including the map entry.

3. The memory controller of claim 1, wherein the flash translation layer is further configured to set a flag corresponding to the map segment including the map entry when the read count is equal to or greater than the reference value.

4. The memory controller of claim 3,
    wherein the flash translation layer selects the map segment to be output to the host memory buffer based on the read count or the flag included in the read count table.

5. The memory controller of claim 4, wherein the flash translation layer selects the map segment of which the flag is set.

6. The memory controller of claim 5, wherein the flash translation layer is further configured to output a map segment request to the memory device to select the map segment and receive the selected map segment from the memory device.

7. The memory controller of claim 6, wherein the flash translation layer is further configured to output the selected map segment to the host memory buffer through the central processing device.

8. The memory controller of claim 1, wherein the flash translation layer is further configured to update the read count table by outputting the read count table to the memory device every preset period.

9. A method of operating a memory controller that controls a memory device, the method comprising:
    receiving a read request from a host;
    searching for a map entry indicating a mapping relationship between a physical block address and a logical block address corresponding to the read request;
    storing a read count table based on a result of searching for the map entry;
    increasing, each time the map entry is searched, a read count included in the read count table;
    receiving the read count table from the memory device; and
    selecting a map segment including the map entry to be output to a host memory buffer included in the host based on the read count,
    wherein the map segment corresponding to the read count which is equal to or greater than a reference value is selected.

10. The method of claim 9, wherein the read count corresponds to the map segment including the map entry.

11. The method of claim 9, further comprising setting a flag corresponding to the map segment including the map entry when the read count is equal to or greater than the reference value.

12. The method of claim 11,
    wherein the map segment is selected based on the flag included in the read count table.

13. The method of claim 12, wherein the map segment of which the flag is set is selected.

14. The method of claim 13, further comprising:
    outputting a map segment request to the memory device to select the map segment; and
    receiving the selected map segment from the memory device.

15. The method of claim 14, further comprising outputting the selected map segment to the host memory buffer.

16. The method of claim 9, further comprising updating the read count table by outputting the read count table to the memory device every preset period.

17. A storage device comprising:
a memory controller configured to:
receive a read request from a host, and
store a read count table based on a result of searching for a map entry indicating a mapping relationship between a physical block address and a logical block address corresponding to the read request; and
a memory device configured to store and update the read count table output from the memory controller every preset period,
wherein the memory device is further configured to output the read count table to the memory controller, and
wherein the memory controller is further configured to select, as a map segment to be output to the host, the map segment corresponding to the read count included in the read count table which is equal to or greater than a reference value.

18. The storage device of claim 17, wherein the memory controller is further configured to:
increase a read count included in the read count table each time the map entry is searched, and
set a flag corresponding to a map segment including the map entry when the read count is equal to or greater than the reference value, the read count corresponding to the map segment.

19. The storage device of claim 18,
wherein the memory controller is further configured to select the map segment of which the flag is set.

20. The storage device of claim 19, wherein the memory controller is further configured to output a map segment request to the memory device to select the map segment and output the selected map segment from the memory device to the host.

* * * * *